(12) United States Patent
Omid-Zohoor et al.

(10) Patent No.: US 10,095,332 B2
(45) Date of Patent: Oct. 9, 2018

(54) PIXEL CHARGING AND DISCHARGING RATE CONTROL SYSTEMS AND METHODS

(71) Applicant: APPLE INC., Cupertino, CA (US)

(72) Inventors: Kasra Omid-Zohoor, San Francisco, CA (US); Jie Won Ryu, Sunnyvale, CA (US); Jiayi Jin, San Jose, CA (US); Hyunwoo Nho, Stanford, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 14/808,882

(22) Filed: Jul. 24, 2015

(65) Prior Publication Data

US 2017/0024043 A1    Jan. 26, 2017

(51) Int. Cl.
   *G06F 3/045*    (2006.01)
   *G06F 3/041*    (2006.01)
   *G06F 3/044*    (2006.01)
   *G09G 3/36*    (2006.01)

(52) U.S. Cl.
   CPC ............ *G06F 3/0412* (2013.01); *G06F 3/044* (2013.01); *G09G 3/3648* (2013.01); *G06F 2203/04103* (2013.01); *G09G 2300/0426* (2013.01); *G09G 2300/0809* (2013.01); *G09G 2310/0251* (2013.01)

(58) Field of Classification Search
   CPC ..... B65B 11/10; B65B 2220/16; B65B 51/22; B65B 57/08; B65B 61/06; G06F 2203/04103; G06F 3/0412; G06F 3/044; G09G 2300/0426; G09G 2300/0809; G09G 2310/0251; G09G 3/3648
   See application file for complete search history.

(56) References Cited

U.S. PATENT DOCUMENTS

| | | | |
|---|---|---|---|
| 7,679,595 B2 | 3/2010 | Luo | |
| 7,876,292 B2 | 1/2011 | Cho | |
| 8,598,591 B2 | 12/2013 | Umezaki | |
| 9,024,848 B2 | 5/2015 | Yamashita | |
| 2007/0085818 A1* | 4/2007 | Amundson | G02F 1/136213 345/102 |
| 2010/0164851 A1* | 7/2010 | Wang | G02F 1/136213 345/98 |
| 2012/0212476 A1* | 8/2012 | Yamauchi | G09G 3/3614 345/212 |
| 2013/0033439 A1* | 2/2013 | Kim | G02F 1/13338 345/173 |

* cited by examiner

*Primary Examiner* — Insa Sadio
(74) *Attorney, Agent, or Firm* — Fletcher Yoder PC

(57) ABSTRACT

Systems and methods for improving display image quality on electronic displays are provided. One embodiment of an electronic display includes display pixels that share a common electrode. Each of the display pixels includes a first conductive path electrically coupled between a pixel electrode and a data line, in which the first conductive path only enables the data line to charge the pixel electrode; and a second conductive path electrically coupled between the pixel electrode and the data line in parallel with the first conductive path, in which the second conductive path enables the data line to discharge the pixel electrode such that discharge rate of the pixel electrode is approximately equal to charge rate of the pixel electrode. Additionally, the embodiment includes a touch pixel that detects occurrence and position of a touch on a screen of the electronic display using the first common electrode.

28 Claims, 19 Drawing Sheets

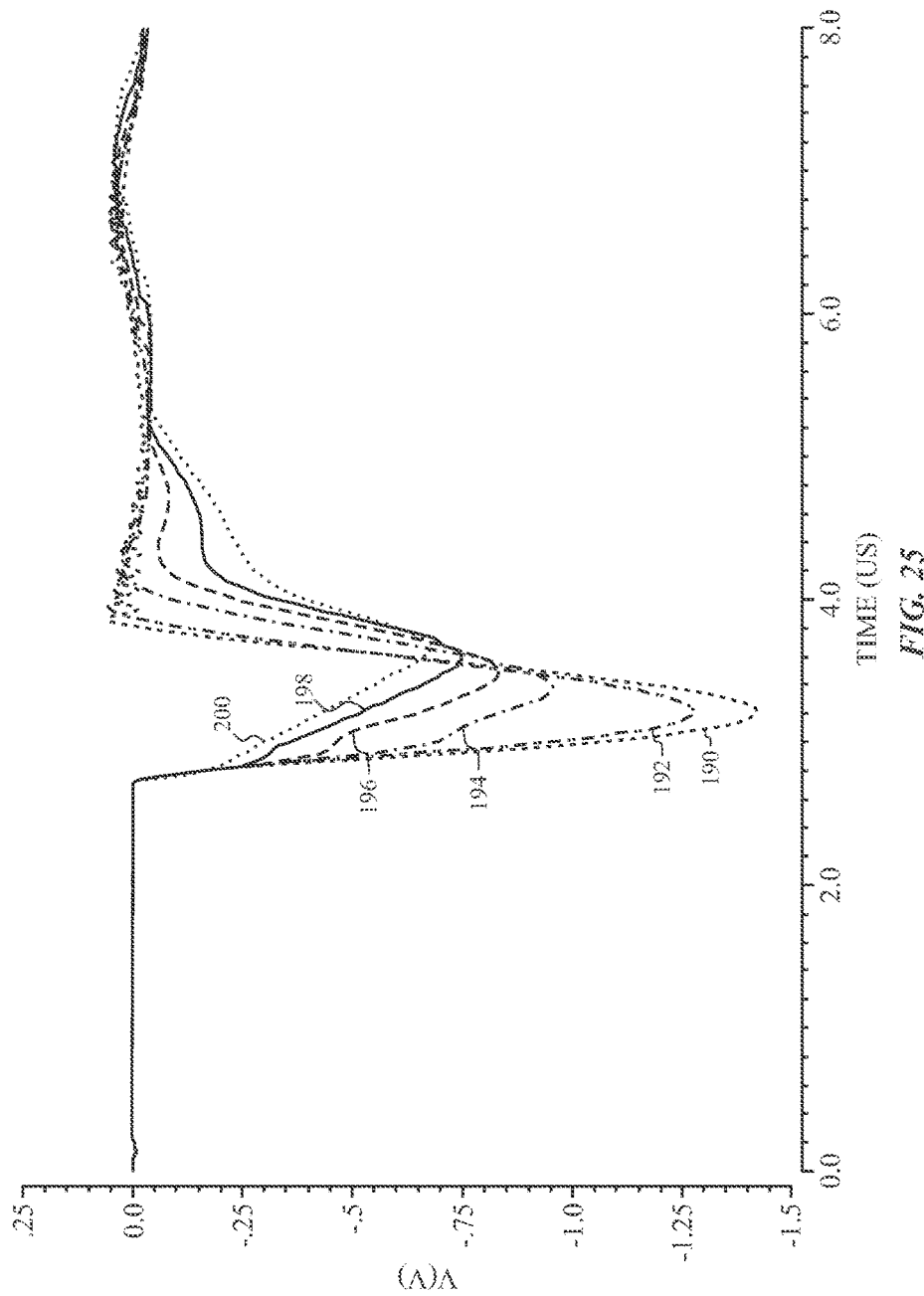

PIXEL CHARGING AND DISCHARGING RATE CONTROL SYSTEMS AND METHODS

BACKGROUND

The present disclosure relates generally to electronic displays and, more particularly, to controlling display of content on electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices include an electronic display, which may display images by writing image frames to a pixel array. The electronic display may write the image frame onto the pixel array by storing voltages in display pixels of the pixel array. Each display pixel may include a pixel electrode (specific to that display pixel) and a common electrode (shared by several display pixels). The voltage stored in the display pixel causes a voltage difference between the pixel electrode and the common electrode. This voltage difference causes an electric field to form in the display pixel. The strength of the electric field affects the amount of light that the display pixel emits. Accordingly, by storing different voltages to different display pixels of the display panel, different amounts of light may be emitted from different display pixels, and thus different images can be made to appear on the electronic display.

The common electrodes used by display pixels may also be used as components for touchscreen functionality. For example, each common electrode may be used as a touch sense electrode or a touch drive electrode, which are used together to detect a capacitance that appears when an object (e.g., a finger) approaches the screen of the electronic display. To accommodate touch pixels for touchscreen functionality, the electronic display may include multiple common electrodes. For example, some common electrodes may be used as touch sense electrodes, and other common electrodes may be used as touch drive electrodes.

Because the different common electrodes are separate from one another, however, the voltages of different common electrodes may vary from one another. These voltage variations could cause different voltages to be stored in different display pixels even when the same voltage is applied to the pixel electrodes of the display pixels. These voltage variations may accordingly affect the brightness of different display pixels, thereby causing perceptible visual artifacts on a displayed image frame.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving quality of image frames displayed on an electronic display, for example, by reducing perceptibility of visual artifacts. More specifically, the electronic display may include multiple common electrodes (Vcoms), which facilitate displaying image frames and detecting touches on a screen of the electronic display. To facilitate touch sensing, some common electrodes may be electrically isolated from one another.

In some embodiments, portions of a common electrode may be in close proximity to a data line and/or pixel electrodes. As such, rapid voltage changes in the data lines and/or pixel electrodes may cause voltage disturbances in the common electrodes. In other words, the common electrode voltage may be perturbed while voltage in the data lines and/or pixel electrodes are changing and settle after the voltage stops changing. The profile of the voltage disturbances may depend on various factors, such as whether the data line is charging or discharging the pixel electrode. Thus, when electrically isolated, the voltage induced on the different common electrodes may vary from one another, thereby affecting voltage across respective pixels and, thus, luminance of display pixels.

In some embodiments, the discharge rate of a pixel electrode may tend to vary from the charge rate of the pixel electrode. As such, profile (e.g., timing, magnitude, and/or duration) of voltage disturbances caused by charging the pixel electrode may vary from voltage disturbances caused by discharging the pixel electrode.

As such, the techniques described herein may reduce voltage variations on a common electrode by adjusting discharge rates of pixel electrodes relative to their charge rates. In some embodiments, display pixels may be modified so that the charge rate and the discharge rate are approximately equal. Thus, in such embodiments, voltage disturbances caused by charging and discharging pixel electrode may have approximately the same profile with opposite polarity, thereby canceling each other out.

For example, a first embodiment of a display pixel includes a first transistor and a second transistor coupled in parallel between a data line and its pixel electrode. Additionally, a diode may be coupled in series with the second transistor so that first transistor may be used to control current flow in one direction while both the first and the second transistors may be used to control current flow in the opposite direction. As such, the channel widths, lengths, mobility, oxide dielectric constant, and oxide thickness of the first transistor and the second transistor may be selected to adjust charge and/or discharge rates of the pixel electrode relative to one another.

Additionally, a second embodiment of a display pixel includes a first one or more diodes electrically coupled in parallel with a second one or more diodes between its transistor and a data line. More specifically, the first one or more diodes may enable current flow in one direction to charge the pixel electrode while the second one or more diodes may allow current flow in the opposite direction to discharge the pixel electrode. As current flows through each diode, the diode may cause a voltage drop. As such, the second one or more diodes may be selected so that the gate to source voltage ($V_{GS}$) of the transistor is lowered when discharging the pixel electrode, thereby reducing the discharge rate of the pixel electrode relative to the charge rate.

The second embodiment may be modified by artificially adjusting the voltage on the body of the transistor by connecting the body to a voltage source. More specifically, the body voltage may be adjusted so that the source to body voltage ($V_{SB}$) of the transistor is increased. The increased source to body voltage may increase the threshold voltage ($V_{TH}$) of the transistor and, thus, reduce discharge rate of the pixel electrode relative to the charge rate.

Furthermore, a third embodiment of a display pixel includes a first diode electrically coupled in parallel with a second diode between its transistor and a data line. More specifically, the first diode may enable current flow in one direction to charge a pixel electrode while the second diode may enable current flow in the opposite direction to discharge the pixel electrode. Additionally, a first inductor may be coupled in series with either the first diode or the second diode. More specifically, since the voltage across the first inductor is proportional to the rate of change in current and inductance, the inductor may be selected to reduce the transistor gate to source voltage ($V_{GS}$) and reduce the charging rate or discharging rate of the pixel electrode relative to one another.

The third embodiment may be modified by electrically coupling a second inductor between a gate line and the transistor and inductively coupling the first inductor and the second inductor. Thus, when the gate line voltage rises to turn on the transistor, the second inductor may induce a voltage in the first transistor, thereby increasing the source voltage of the transistor. In this manner, the gate to source voltage ($V_{GS}$) of the transistor may be increased, thereby reducing the discharge rate of the pixel electrode relative to the charge rate.

BRIEF DESCRIPTION OF THE DRAWINGS

Various aspects of this disclosure may be better understood upon reading the following detailed description and upon reference to the drawings in which:

FIG. 25 is a plot of common electrode voltage in the modified display pixel of FIG. 22 when discharging, in accordance with an embodiment.

DETAILED DESCRIPTION OF SPECIFIC EMBODIMENTS

Figure 1:
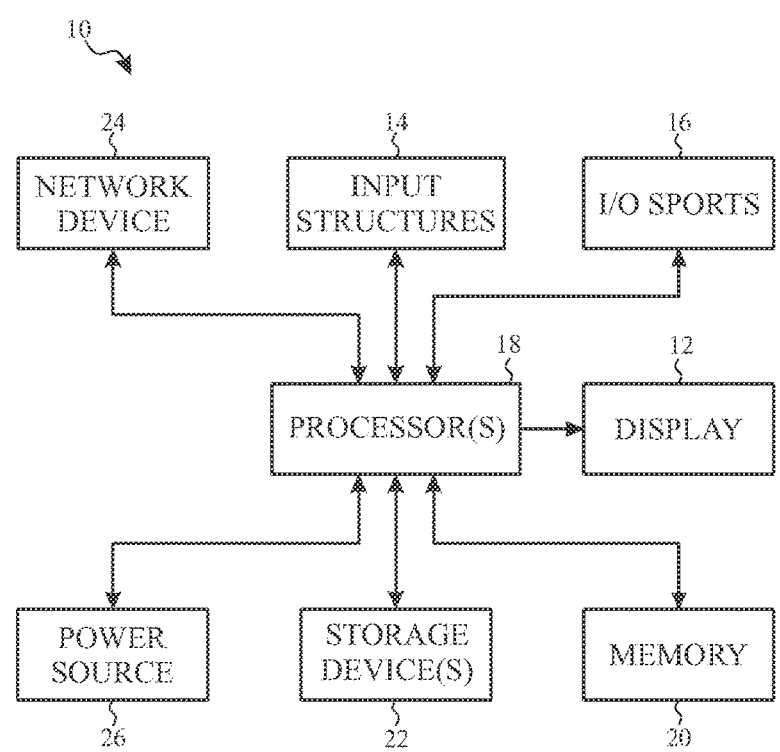
FIG. 1 is a block diagram of a electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned above, embodiments of the present disclosure relate to electronic displays, such as a liquid crystal display (LCD), with display and touch sensing capabilities. More specifically, an electronic display may include display components that write image frames to display pixels of a pixel array. For example, the display components may include pixel electrodes, which store a voltage received from a data line, and common electrodes (Vcoms), which form electric fields with the pixel electrodes. Voltage difference between a pixel electrode and its corresponding common electrode may affect magnitude of a produced electric field and, thus, luminance of the display pixel.

Additionally, the electronic display may include touch components that detect occurrence and/or position of an object touching its screen using touch pixels. For example, the touch components may include touch drive electrodes that carry a touch drive signal and touch drive electrodes that indicate occurrence of a touch based on changes in capacitance with the touch drive electrodes. Position of one or more touch pixels that detect a touch may, thus, indicate position of the touch.

To facilitate reducing size and/or component cost, some components of the electronic display may be utilized as both display components and touch components. In some embodiments, common electrodes may also function as touch drive electrodes or touch sense electrodes. For example, a first common electrode may function as a touch drive electrode and a second common electrode may function as a touch sense electrode. As such, to facilitate touch sensing, common electrodes functioning as touch sense electrodes may be electrically isolated from common electrodes functioning as touch drive electrodes. For example, the first common electrode may be electrically isolated from the second common electrode with a gap (e.g., space) therebetween.

In some embodiments, a common electrode may be shared between multiple pixel electrodes. For example, the first common electrode be used to generate electric fields with a first group of pixel electrodes and the second common electrode may be used to generate electric fields with a second group of pixel electrodes. As such, a common electrode may be in close proximity to its corresponding group of pixel electrodes and data lines that supply voltage to the group of pixel electrodes.

However, rapid voltage changes in the data lines and/or pixel electrodes may cause capacitive coupling and, thus, voltage disturbances in the common electrode. For example, when increasing in voltage (e.g., charging), a pixel electrode may cause a positive voltage disturbance in a common electrode. On the other hand, when decreasing in voltage (e.g., discharging), the pixel electrode may cause a negative voltage disturbance in the common electrode. As such, the common electrode voltage may be perturbed while voltage in the data lines and/or pixel electrodes are changing and settle after the voltage stops changing.

In some embodiments, the profile of voltage disturbances depend on various factors, such as amount of overlap between the common electrodes and a data line, whether a pixel electrode is connected to the data line, and whether the data line is charging or discharging the pixel electrode. For example, the larger the amount of overlap the greater the magnitude of voltage disturbances caused on a common electrode. Additionally, when a data line is connected to a pixel electrode, voltage changes in the pixel electrode may also cause a voltage disturbance in addition to voltage disturbances caused by data lines. Furthermore, pixel electrodes may have different charge rates and discharge rates and, thus, produce voltage disturbance with different profiles (e.g., timing, magnitude, and/or duration).

In other words, the voltage disturbances on each common electrode may depend on variable operating conditions, such as position in the display panel and/or operation of corresponding display pixels. Thus, when electrically isolated, different common electrodes may experience varying voltage disturbances.

However, timing and/or magnitude of the voltage disturbances may affect the voltage stored in the pixel electrode and, thus, luminance of the display pixels. For example, a positive voltage disturbance may cause voltage held in a pixel electrode to decrease. As such, if the pixel electrode is disconnected from its data line during the positive voltage disturbance, the reduced voltage may be stored in the pixel electrode, thereby decreasing luminance of the display pixel. On the other hand, a negative voltage disturbance may cause voltage held in the pixel electrode to increase. As such, if the pixel electrode is disconnect from its data line during the voltage disturbance, the increased voltage may be stored in the pixel electrode, thereby increasing luminance of the display pixel.

Accordingly, as will be described in more detail below, the present disclosure provides techniques to improve quality of images displayed on an electronic display by reducing magnitude of voltage disturbances on a common electrode. In some embodiments, the discharge rate and/or the charge rate of pixel electrodes may be adjusted with respect to one another so that voltage disturbances on a common electrode cancel out. For example, when a first pixel electrode is being charged, a positive voltage disturbance may be caused on the common electrode. Additionally, when a second pixel electrode is being discharged, a negative voltage disturbance may be caused on the common electrode. As such, it may be possible for the positive voltage disturbance and the negative voltage disturbance to cancel, thereby reducing the net voltage disturbance on a shared common electrode.

However, as described above, the charge rate and discharge rate of pixel electrodes may be different. For example, the discharge rate of a pixel electrode may tend to be faster than its charge rate. In other words, the pixel electrode may change voltage faster when discharging than when charging. Accordingly, since magnitude of capacitive coupling is determined based on change of voltage over change in time, the profile (e.g., timing, magnitude, and duration) of voltage disturbances caused by charging and discharging may vary. For example, when unadjusted, the negative voltage disturbance caused by the second pixel electrode may have a higher magnitude and a shorter duration than the positive voltage disturbance caused by the first pixel electrode.

As such, embodiments of the present disclosure may facilitate reducing voltage disturbances on a common electrode by adjusting the charge and/or discharge rate of pixel electrodes that share the common electrode. For example, the discharge rate of the second pixel electrode may be reduced relative to the charge rate of the first pixel electrode. In this manner, the positive voltage disturbance caused by the first pixel electrode and the negative voltage disturbance caused by the second pixel electrode may have approximately the same profile (e.g., timing, magnitude, and/or duration) and opposite magnitude, thereby canceling.

The present disclosure provides various techniques for modifying display pixels to adjust charge and/or discharge rate of pixel electrodes. In some embodiments, display pixels may be modified so that current bandwidths available to charge and/or discharge a pixel electrode are different. For example, a first transistor may be used to discharge the pixel electrode, whereas the first transistor and a second transistor may both be used to charge the pixel electrode. In other embodiments, display pixels may be modified to place limits on the charge rate and/or discharge rates of a pixel electrode. For example, an inductor may be included on a discharge path to reduce rate of current increase and, thus, the discharge rate of the pixel electrode.

To help illustrate, a computing device 10 that may utilize an electronic display 12 to display image frames provide touch sensing is described in FIG. 1. As will be described in more detail below, the computing device 10 may be any suitable computing device, such as a handheld computing device, a tablet computing device, a notebook computer, and the like.

Accordingly, as depicted, the computing device 10 includes the electronic display 12, input structures 14, input/output (I/O) ports 16, one or more processor(s) 18, memory 20, a non-volatile storage device 22, a network interface 24, and a power source 26. The various components described in FIG. 1 may include hardware elements (e.g., circuitry), software elements (e.g., a tangible, non-transitory computer-readable medium storing industrious), or a combination of both hardware and software elements. It should be noted that FIG. 1 is merely one example of a particular implementation and is intended to illustrate the types of components that may be present in the computing device 10. Additionally, it should be noted that the various depicted components may be combined into fewer components or separated into additional components. For example, the memory 20 may be included in the non-volatile storage device 22.

As depicted, the processor 18 is operably coupled with memory 20 and/or the non-volatile storage device 22. More specifically, the processor 18 may execute instruction stored in memory 20 and/or non-volatile storage device 22 to perform operations in the computing device 10, such as generating and/or transmitting image data to the display 12. As such, the processor 18 may include one or more general purpose microprocessors, one or more application specific processors (ASICs), one or more field programmable logic arrays (FPGAs), or any combination thereof. Additionally, the memory 20 and the non-volatile storage device 22 may be tangible, non-transitory, computer-readable mediums that store instructions executable by and data to be processed by the processor 18. For example, the memory 20 may include random access memory (RAM) and the non-volatile storage device 22 may include read only memory (ROM), rewritable flash memory, hard drives, optical discs, and the like. By way of example, a computer program product containing the instructions may include an operating system or an application program.

Additionally, as depicted, the processor 18 is operably coupled with the network interface 24 to communicatively couple the computing device 10 to a network. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. Furthermore, as depicted, the processor 18 is operably coupled to the power source 26, which may provide power to the various components in the computing device 10. As such, the power source 26 may include any suitable source of energy, such as a rechargeable lithium polymer (Li-poly) battery and/or an alternating current (AC) power converter.

As depicted, the processor 18 is also operably coupled with I/O ports 16, which may enable the computing device 10 to interface with various other electronic devices, and input structures 14, which may enable a user to interact with the computing device 10. Accordingly, the inputs structures 14 may include buttons, keyboards, mice, trackpads, and the like.

In addition to the input structures 14, the electronic display 12 may include touch components that facilitate user inputs by detecting occurrence and/or position of an object touching its screen (e.g., surface of the electronic display 12). As will be described in more detail below, the electronic display 12 may include touch sensing components (e.g., touch pixels) that indicate occurrence of the touch based on a change of impedance.

In addition to enabling user inputs, the electronic display 12 may include display components (e.g., display pixels) that display image frames, such as a graphical user interface (GUI) for an operating system, an application interface, a still image, or video content. As depicted, the display is operably coupled to the processor 18. Accordingly, image frames displayed by the electronic display 12 may be based on image data received from the processor 18. The electronic display 12 may then write the image frame to a display panel by storing a voltage in one or more display pixels.

Figure 2:
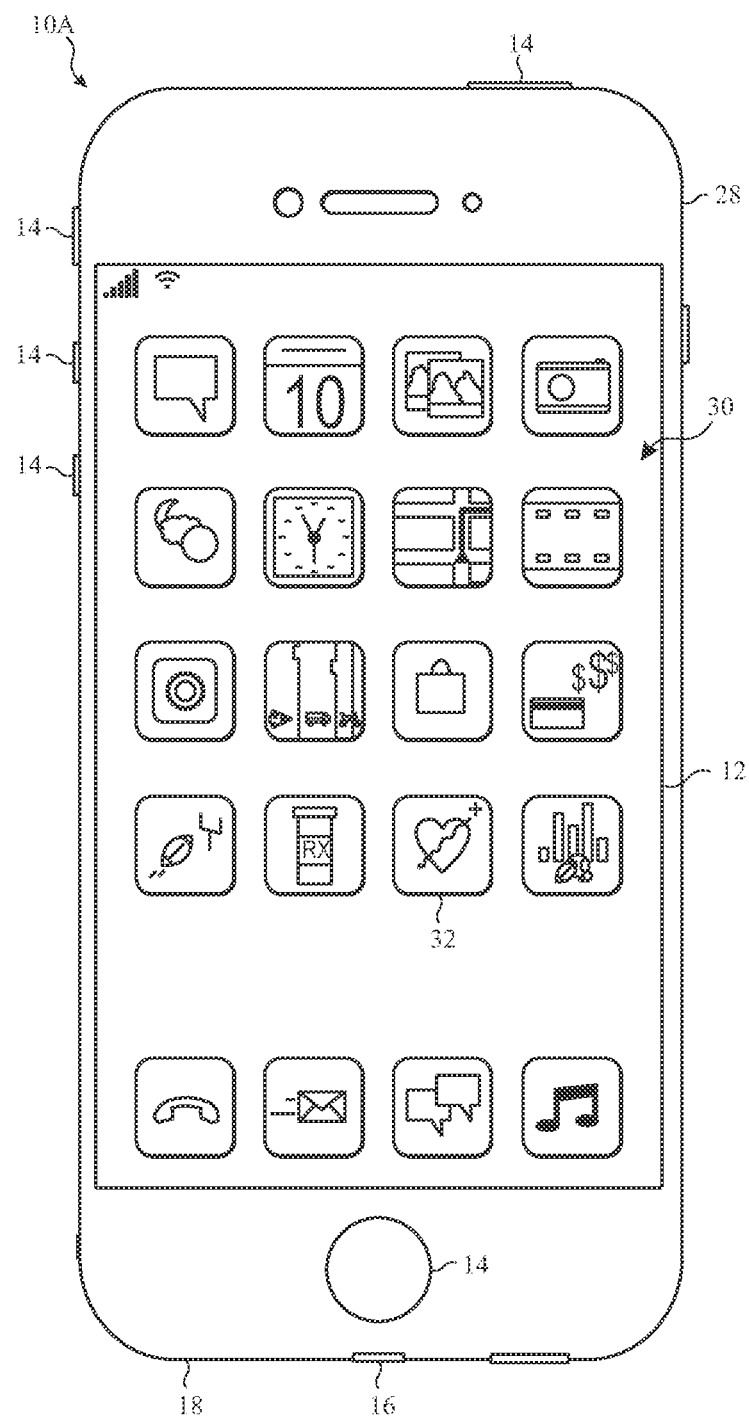
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and to shield them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Thus, a pixel electrode 74 may be selectively connect to and disconnected from a data line to control voltage stored in the pixel electrode and, thus, luminance of the display pixel 70. More specifically, a pixel electrode 74 may be connected to a data line 80 to charge or discharge the pixel electrode 74 based on data signals 46 output by the data driver 64 via data lines 80. Additionally, the pixel electrode may be disconnected from the data line 80 to store a voltage in the pixel electrode 74. As such, in some embodiments, the data driver 64 may part of the display controller 36.

Figure 3:
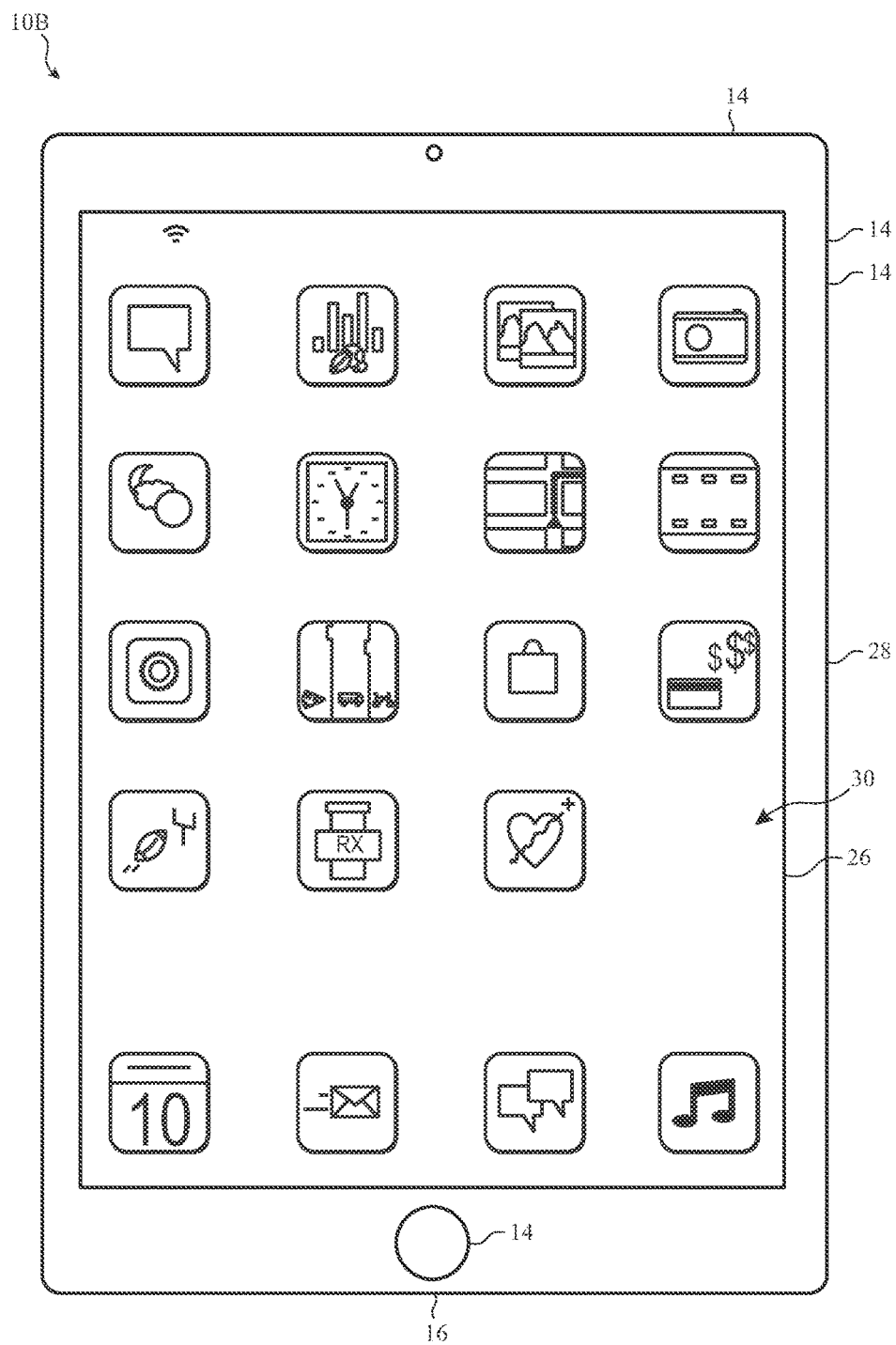
FIG. 3 is an example of the electronic device of FIG. 1, in accordance with an embodiment.
Figure 4:
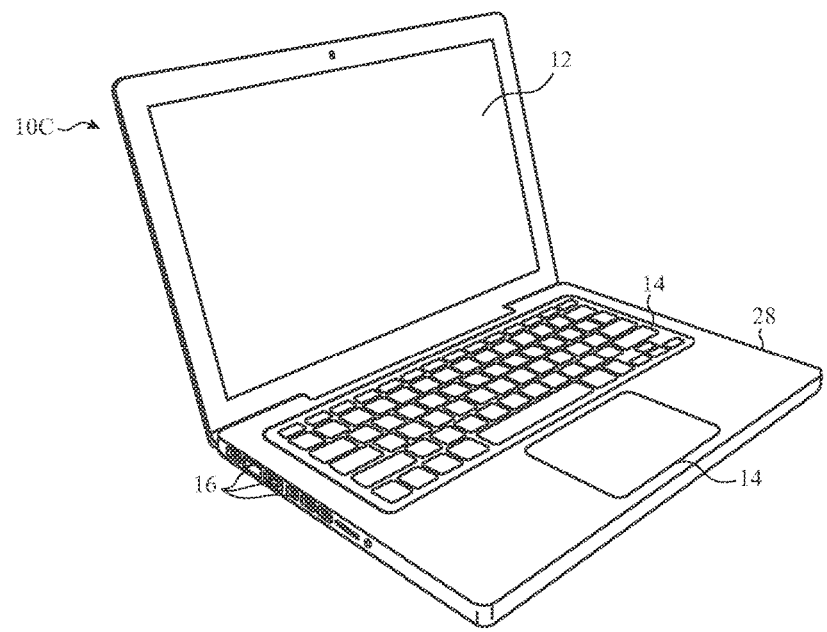
FIG. 4 is an example of the electronic device of FIG. 1, in accordance with an embodiment.

To further illustrate a suitable computing device 10, a tablet device 10B is described in FIG. 3, such as any iPad® model available from Apple Inc. Additionally, in other embodiments, the computing device 10 may take the form of a computer 10C as described in FIG. 4, such as any Macbook® or iMac® model available from Apple Inc. As depicted, the tablet device 10B and the computer 10C both also include a display 12, input structures 14, I/O ports 16, and an enclosure 28.

Figure 5:
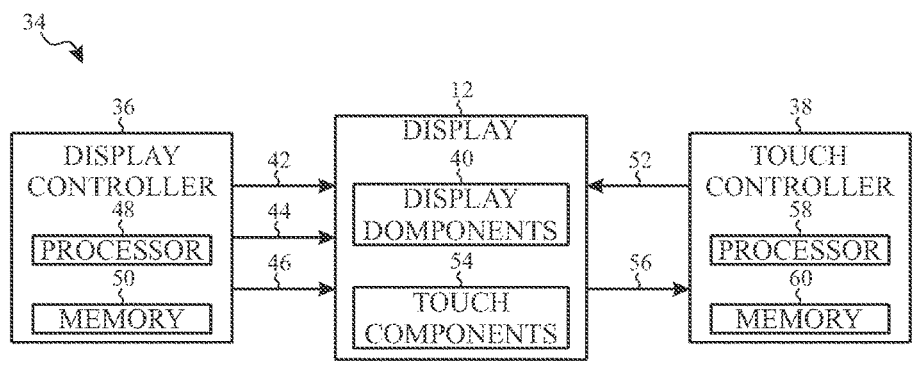
FIG. 5 is a block diagram of a portion of the electronic device of FIG. 1, in accordance with an embodiment.

As described above, the electronic display 12 may enable displaying image frames and detecting user inputs. To help illustrate, a portion 34 of the computing device 10 is described in FIG. 5. As depicted, the portion 34 includes the electronic display 12, a display controller 36, and a touch controller 38. In the depicted embodiment, the display controller 36 may control the display of image frames on the electronic display 12. For example, the display controller 36 may process image data and transmit control signals to display component 40 in the electronic display 12. In some embodiments, the control signals may include gate signals 42, common electrode (Vcom) signals 44, and/or data signals 46. As will be described in more detail below, the gate signals 42 may instruct a transistor (e.g., a display component 40) to connect or disconnect a pixel electrode from a data line. Additionally, the common electrode signals 44 may be used to set voltage on common electrodes (e.g., display components 40). Furthermore, the data signals 46 may be used to store voltage in a pixel electrode.

To facilitate generating and/or transmitting the control signals, the display controller 36 may include a processor 48 and memory 50. In some embodiments, the display controller processor 48 may be included in processor 18 and/or in separate processing circuitry. Additionally, in some embodiments, the display controller memory 50 may be included in memory 20, the non-volatile storage device 22, and/or another suitable tangible, non-transitory computer-readable medium. In some embodiments, the display controller memory 50 may include a buffer to store image data for processing.

On the other hand, in the depicted embodiment, the touch controller 38 may control detection of user inputs via touches to the screen of the electronic display. For example, the touch controller 38 may transmit touch drive signals 52 to touch drive electrodes (e.g., touch components 54) in the electronic display 12 and receive touch sense signals 56 from the touch sense electrodes (e.g., touch components 54). As will be described in more detail below, the touch drive signals 52 may be an alternating current (AC) signal supplied to a touch drive electrode to generate a mutual capacitance with a touch sense electrode. Additionally, the touch sense signals 56 may be an AC signal transmitted from the touch sense to indicate the mutual capacitance.

Thus, the touch controller 38 may process the touch sense signals 56 to detect occurrence and/or position of a touch. More specifically, when a touch occurs, the mutual capacitance at the location of the touch may decrease. As such, the magnitude of the touch sense signals 56 returned by the touch sense electrodes at that location may decrease. In this manner, the touch controller 38 may process the touch sense signals 56 to determine occurrence of a touch. Additionally, the touch controller 38 may determine location of the touch based on location of the touch sense signals that indicated the occurrence of the touch and/or magnitude of the touch sense signals 56.

To facilitate transmitting the tough drive signals 52 and/or processing the touch sense signals 56, the touch controller 38 may include a processor 58 and memory 60. In some embodiments, the touch controller processor 58 may be included in processor 18 and/or in separate processing circuitry. Additionally, in some embodiments, the touch controller memory 60 may be included in memory 20, the non-volatile storage device 22, and/or another suitable tangible, non-transitory computer-readable medium.

Figure 6:
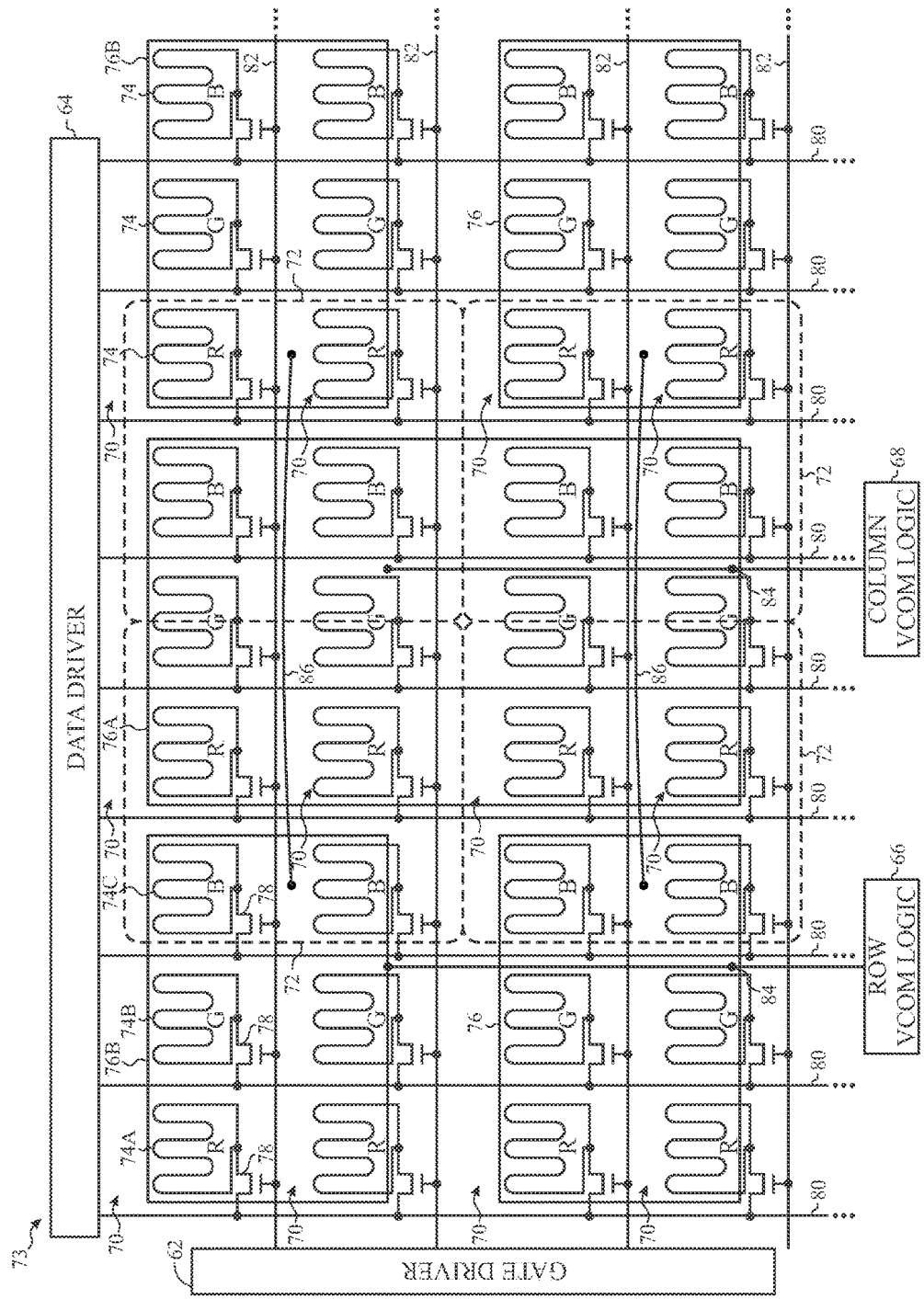
FIG. 6 is a schematic diagram of a portion of pixel array in the electronic display of FIG. 1, in accordance with an embodiment.

To further illustrate the display and touch sensing capabilities, a schematic view of the electronic display 12 is described in FIG. 6. As depicted, the electronic display 12 includes a data driver 64, a gate driver 62, a row common electrode logic 66, a column common electrode logic 68, multiple display pixels 70, and multiple touch pixels 72. The display pixels 70 may be arranged in a pixel array 73 with each display pixel 70 including one or more pixel electrodes 74 at intersections of a data line 80 and a gate line 82. For example, in the depicted embodiment, each display pixel 70 includes a red pixel electrode 74, a blue pixel electrode 74, and a green pixel electrode 74. Although only twelve display pixels 70 are shown, it should be understood that in an actual implementation, the pixel array 73 may include hundreds or thousands of such display pixels 70.

Additionally, in the depicted embodiment, each display pixel 70 includes multiple transistors 78 that each selectively connects and disconnects a pixel electrode 74 from a data line 80. More specifically, each transistor 78 may connect or disconnect a pixel electrode 74 based on gate signals 42 output from the gate driver 62 via a gate line 82. As such, in some embodiments, the gate driver 62 may be part of the display controller 48. Additionally, in some embodiments, the transistors 78 may be thin film transistors (TFTs), complementary metal oxide semiconductor (CMOS) transistors, metal oxide semiconductor field effect transistors (MOSFETs), bipolar junction transistors (BJTs), or another suitable switching device.

As described above, the voltage stored in each pixel electrode 74 relative to voltage of a corresponding common electrode 76 may generate an electrical field that control luminance of the display pixel 70. For example, in a LCD display, the electric field may alter the arrangement of liquid crystals in the electronic display 12. When the arrangement of the liquid crystals changes, the amount of light passing through the display pixel 70 also changes.

Thus, a pixel electrode 74 may be selectively connect to and disconnected from a data line to control voltage stored in the pixel electrode and, thus, luminance of the display pixel 70. More specifically, a pixel electrode 74 may be connected to a data line 80 to charge or discharge the pixel electrode 74 based on data signals 46 output by the data driver 64 via data liens 80. Additionally, the pixel electrode may be disconnected from the data line 80 to store a voltage in the pixel electrode 74. As such, in some embodiments, the data driver 64 may part of the display controller 36.

As described above, the luminance of a display pixel 70 may also be based at least in part on the voltage of the common electrode 76. In the depicted embodiment, the electronic display 12 includes multiple electrically isolated common electrodes 76 to facilitate touch sensing. In some embodiments, the common electrodes 76 may be organized as column common electrodes 76A and row common electrodes 76B to function as touch drive electrodes or touch sense electrodes. For example, in the depicted embodiment, the pixel array 73 includes one column common electrode 76A and four row common electrodes 76B. A touch pixel 72 may be formed at a junction between a row common electrode 76B and a column common electrode 76A. For example, in the depicted embodiment, the pixel array 73 includes four touch pixels 72.

In some embodiments, each of the column common electrodes 76A may function as touch sense electrodes and each of the row common electrodes 76B may function as touch drive electrodes. In such embodiments, the row common electrode (Vcom) logic 66 may supply touch drive signal 52 to the row common electrodes 76B via common electrode traces 84. Additionally, the column common electrode (Vcom) logic 68 may receive touch sense signals 56 from the column common electrodes 76A. The column common electrode logic 68 may then process 56 the touch sense signals 56 to detect occurrence and/or location of a touch on the screen of the electronic display 12. As such, in some embodiments, portions of the row common electrode logic 66 that transmit the touch drive signals 52 and portions of the column common electrode logic 68 that process the touch sense signals 56 may be part of the touch controller 38.

On the other hand, when facilitating display of image frames, the row common electrode logic 66 may supply a direct current (DC) bias voltage to the row common electrodes 76B and the column common electrode logic 68 may supply a DC bias voltage to the column common electrodes 76A. As such, the row common electrode logic 66 may switch between outputting touch drive signals and the DC bias voltage. Similarly, the column common electrode logic 68 may switch between receiving touch sense signals and outputting the DC bias voltage. In some embodiments, each row common electrode 76B in the same row may be separately connected to the row common electrode logic 66. Additionally, or alternatively, row common electrodes 76B in the same row may be electrically coupled via conductive links 86 that bypass column common electrodes 76A therebetween.

Since luminance of a display pixel 70 is based at least in part on common electrode voltage, variations in voltage between common electrodes 76 may cause variations in luminance, which may be perceived as visual artifacts (e.g., a vertical stripe feature of merit (VSFOM)). To reduce the likelihood of perceivable visual artifacts, each of the common electrodes may be supplied approximately the same DC bias voltage based on the Vcom signal 44. As such, in some embodiments, portions of the row common electrode logic 66 and the column common electrode logic 68 that generate the DC bias voltage may part of the display controller 36.

Nevertheless, since electrically isolated from one another, it may still be possible for voltage on different common electrodes 76 to vary. As described above, the variations may be caused by voltage disturbances due to capacitive coupling between the common electrodes 76 and the data lines 80 and/or capacitive coupling between the common electrodes 76 and pixel electrodes 74.

Figure 7:
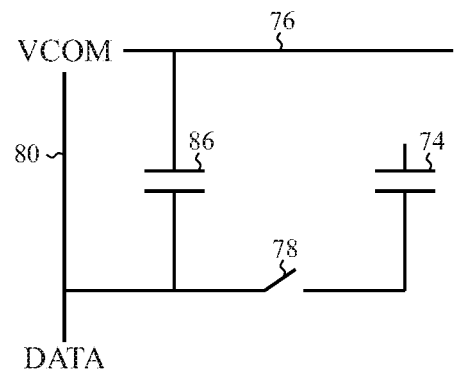
FIG. 7 is a representative diagram of capacitive coupling in the electronic display when a pixel electrode is disconnected, in accordance with an embodiment.
Figure 8:
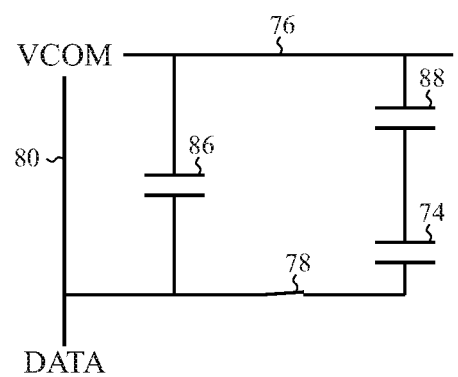
FIG. 8 is a representative diagram of capacitive coupling in the electronic display when the pixel electrode is connected, in accordance with an embodiment.

To help illustrate, FIGS. 7 and 8 depict a circuit representation of capacitive coupling to a common electrode 76. More specifically, FIG. 7 describes capacitive coupling when a pixel electrode 74 is disconnected from a data line 80 and FIG. 8 describes capacitive coupling when the pixel electrode 74 is connected to the data line 80.

As depicted, regardless of whether the pixel electrode 74 is connected, capacitive coupling 86 may occur between the data line 80 and the common electrode 76 due to rapid voltage changes in the data line 80. In some embodiments, successive image frames may be displayed by applying alternating polarity voltages. As such, voltage on the data line 80 may rapidly change at least each time a successive image frame is displayed, if not more to change voltage supplied to successively written display pixels 70. For example, in a 60 Hz electronic display 12, the data line 80 may rapidly change voltage at least sixty times a second, thereby producing capacitive coupling 86 and, thus, voltage disturbance on the common electrode 76.

In some embodiments, the magnitude of the voltage disturbances in on the common electrode 76 may be based at least in part on amount of the common electrode 76 that is in close proximity to the data lines 80. For example, with regard to FIG. 6, the data lines 80 may run directly below the common electrodes 76 and, thus, cause voltage disturbances in the common electrodes 76 that overlap the data lines 80. However, as depicted, the size of row common electrodes 76B and column common electrodes 76A vary. As such, the amount of overlap with the data lines 80 may also vary, thereby causing different profile voltage disturbances in the row common electrodes 76B and the column common electrodes 76A. In other words, the voltage disturbances may vary based at least in part on size of the common electrodes 76.

As described above, the common electrodes 76 may be electrically connected to common electrode traces 84. In some embodiments, a common electrode trace 84 may run in parallel with a data line 80. As such, rapid voltage changes in the data line 80 may also cause voltage disturbances in the common electrode trace 84 and, thus, the common electrode 76. However, the length of the common electrode traces 84 connected to different common electrodes 76 may vary and, thus, affect profile of voltage disturbances. In some embodiments, length of common electrode trace 84 connected to a row common electrode 76B may be based at least in part on distance between the row common electrode 76B and the row common electrode (Vcom) logic 66. As such, magnitude of voltage disturbances caused in a common electrode 76 may vary based at least in part on location of the common electrode 76 on the electronic display 12.

Returning to FIG. 8, when the pixel electrode 74 is connected, the data line 80 may either charge or discharge the pixel electrode 74. As such, the voltage of the pixel electrode 74 may rapidly change, thereby causing capacitive coupling 88 with the common electrode 76. In other words, when the pixel electrode 74 is connected, capacitive coupling 88 between pixel electrode 74 and the common electrode 76 may occur in addition to capacitive coupling 86 between the data line 80 and the common electrode 76. Thus, the magnitude of voltage disturbances on the common electrode 76 may increase when the pixel electrode 74 is connected to the data line 80.

Figure 9:
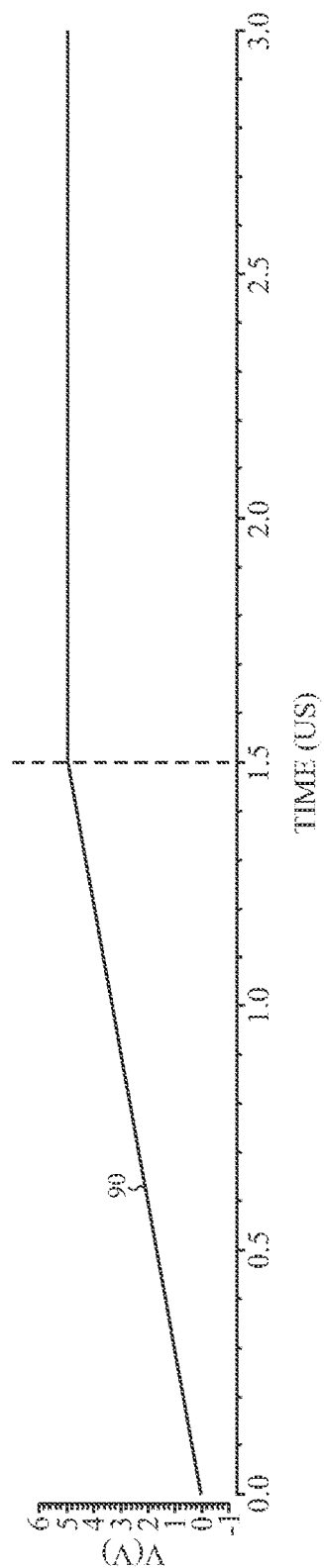
FIG. 9 is a plot of a data signal in the electronic display, in accordance with an embodiment.
Figure 10:
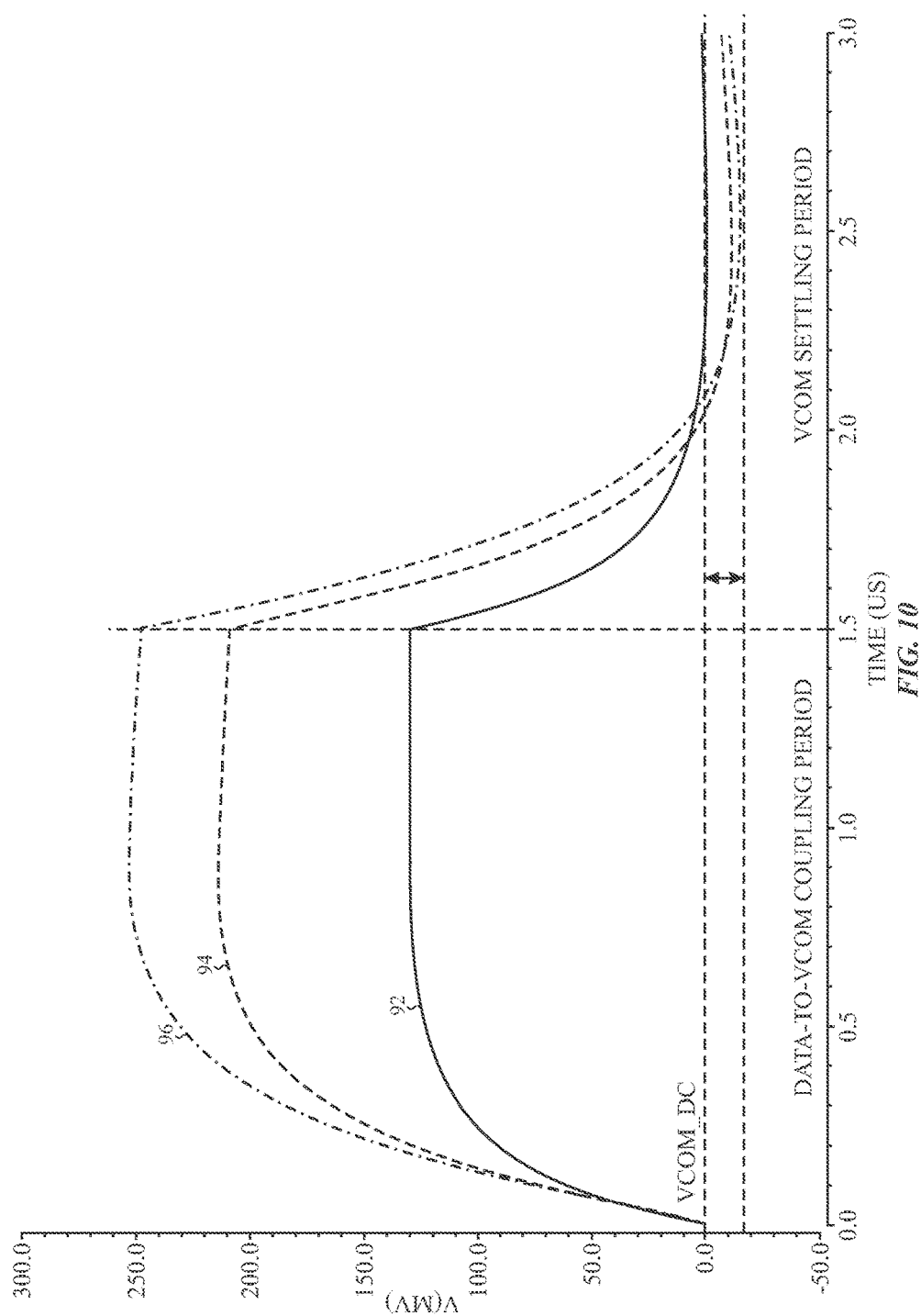
FIG. 10 is a plot of common electrode voltage in response to the data signal of FIG. 9 when pixel electrodes are disconnected, in accordance with an embodiment.
Figure 11:
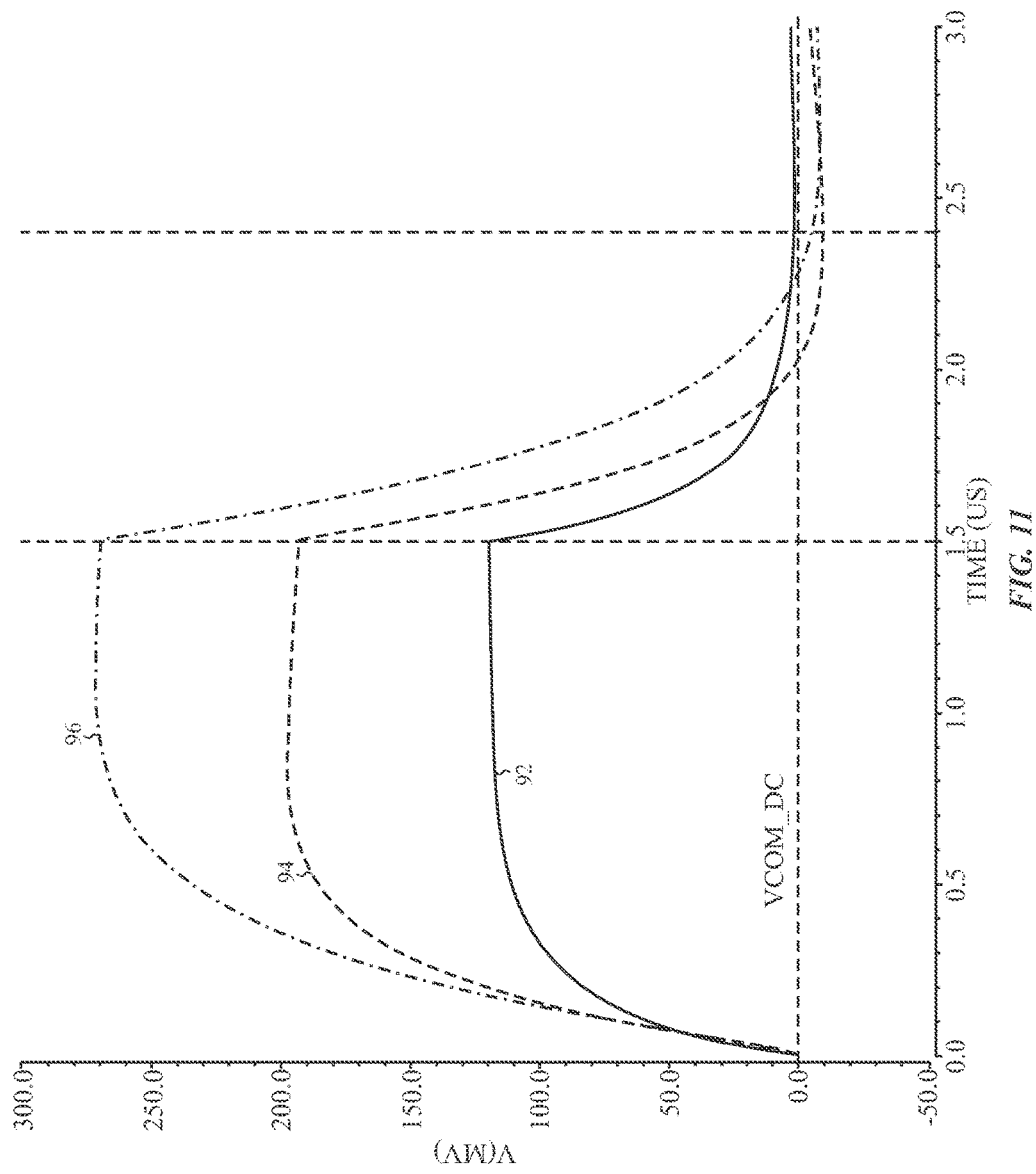
FIG. 11 is a plot of common electrode voltage in response to the data signal of FIG. 9 when pixel electrodes are connected, in accordance with an embodiment.

To help illustrate, FIGS. 9-11 describe effect changes in voltage may have row common electrodes 76B. Specifically, FIG. 9 is a plot describing voltage of a data signal 90 over time. As depicted, the data signal 90 initially starts at 0V and linearly increases to 5V in 1.5 microseconds and remains at 5V for 1.5 microseconds. As such, the data signal 90 may be used to charge a connected pixel electrode 74, for example, to change a display pixel from a minimum luminance (e.g., black) to a maximum luminance (e.g., white).

Additionally, FIGS. 10 and 11 are plots of voltage 92 on a first row common electrode 76B, voltage 94 on a second row common electrode 76B, and voltage 96 on a third row common electrode 76B. In the described embodiments, the first row common electrode 76B is located closest to the row common electrode (Vcom) logic 66, the third row common electrode 76B is located furthest from the row common electrode logic 66, and the second row common electrode 76B is located between the first row common electrode 76B and the third row common electrode 76B.

More specifically, FIG. 10 describes the common electrode voltages 92, 94, and 96 when all pixel electrodes 74 corresponding with the row common electrodes 76B are disconnected. In other words, the voltage disturbances in the row common electrodes 76B may result from capacitive coupling 86 between data lines 82 and the row common electrodes 76B.

As depicted, the voltage increase in the data signal 90 between 0-1.5 microseconds causes a positive voltage disturbance in each row common electrode 76B. More specifically, the data signal 90 between 0-1.5 microseconds causes the voltage 92 of the first row common electrode 76B to increase to approximately 130 mV, the voltage 94 of the second row common electrode 76B to increase to approximately 210 mV, and the voltage 96 of the third row common electrode 76B to increase to approximately 250 mV. As described above, the difference in magnitude of the voltage disturbances may be due to distance from the row common electrode logic 66.

Subsequently, as depicted, the steady voltage of the data signal 90 between 1.5-3.0 microseconds ceases the voltage disturbances, thereby allowing the row common electrodes 76B to settle back to the DC bias voltage supplied by the row common electrode logic 66. Nevertheless, the settling is generally not instantaneous. For example, in the depicted embodiment, the row common electrodes 76B each take greater than 0.5 microseconds before settling back to the DC bias voltage with some overshoot.

On the other hand, FIG. 11 describes the common electrode voltages 92, 94, and 96 when all pixels electrodes 74 corresponding with the first and second row common electrodes 76B are disconnected and one or more pixel electrodes 74 corresponding with the third row common electrodes 76B are connected (e.g., charging). As such, voltage disturbances in the first and second row common electrodes 76B may result from capacitive coupling 86 with data lines 82. Thus, voltages 92 and 94 of the first and second row common electrodes 76B remain approximately the same as described in FIG. 10.

However, voltage disturbances in the third row common electrodes 76B may result from both capacitive coupling 86 with data lines 82 and capacitive coupling 88 with the connected one or more pixel electrodes. As depicted, the voltage increase in the data signal 90 between 0-1.5 microseconds causes the voltage 96 of the third row common electrode 76B to increase to approximately 275 mV. As such, the voltage 96 of the third row common electrode 76B is increased when the one or more pixel electrodes 74 are connected as compared to when the one or more pixel electrodes 74 are disconnected. Furthermore, since magnitude of the voltage disturbance is greater, the voltage 96 of the third row common electrode 76B takes longer to settle back to the DC bias voltage.

Since a data line 80 may be selectively connected to multiple display pixels 70 and different display pixels 70 may have varying desired luminances, voltage changes on the data line 80 may be unavoidable. As such, techniques may be employed to reduce the magnitude of voltage disturbances on common electrodes 76 caused by capacitive coupling 86 with the data lines 80. However, as described above, capacitive coupling 88 between the pixel electrodes 74 and the common electrodes 76 may further increase the magnitude of disturbance voltages. For example, even when voltage on a data line 80 remains relatively steady, the voltage at the pixel electrodes 74 may change to enable alternating polarity of successively displayed image frames. In other words, the data line 80 still may charge or discharge a pixel electrode 74, thereby causing capacitive coupling 88 between the pixel electrode 74 and the common electrode 76.

Figure 12:
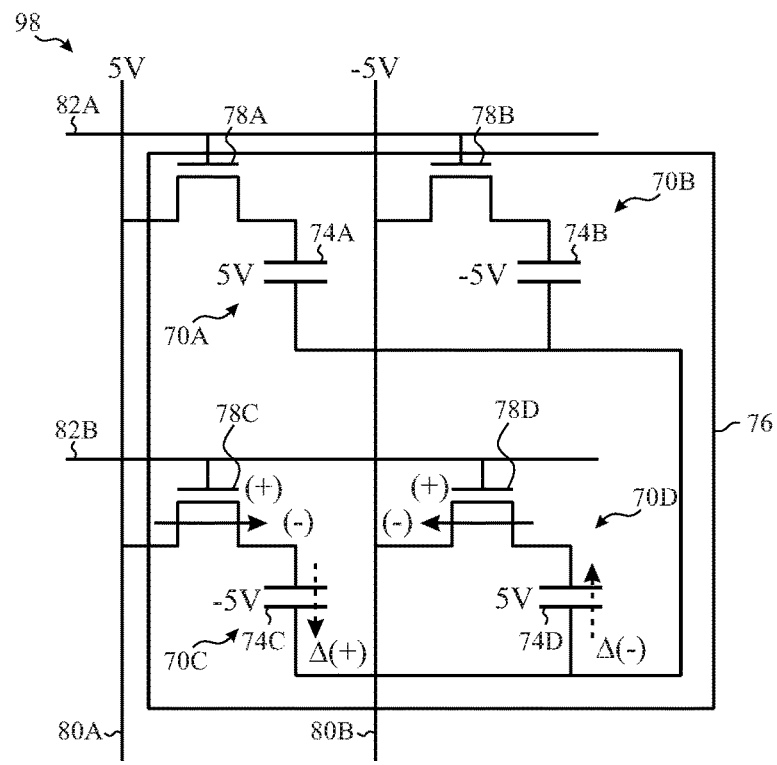
FIG. 12 is a schematic diagram of a portion the pixel array of FIG. 6, in accordance with an embodiment.
Figure 13:
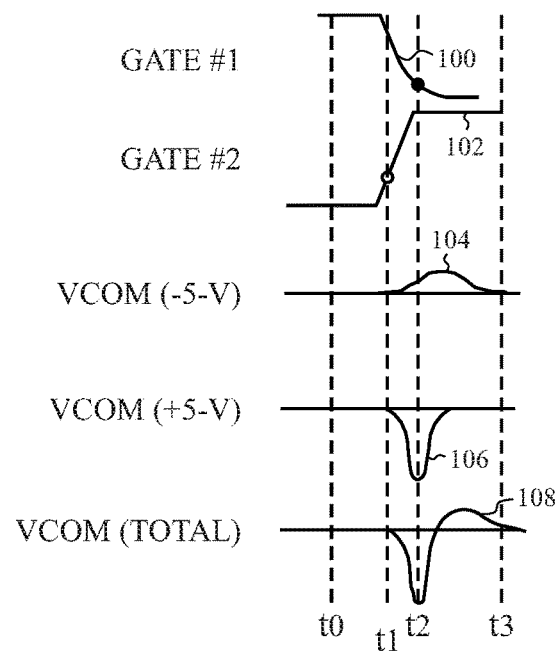
FIG. 13 is a timing diagram describing operation of the portion of the pixel array of FIG. 12, in accordance with an embodiment.

To help illustrate, FIG. 12 describes a portion 98 of the pixel array 73. In the depicted example, the portion 98 includes a first display pixel 70A, a second display pixel 70B, a third display pixel 70C, a fourth display pixel 70D, a common electrode 76, a first gate line 82A, a second gate line 82B, a first data line 80A, and a second data line 80B. More specifically, the first display pixel 70A includes a first pixel electrode 74A and a first transistor 78A that selectively connects the first pixel electrode 74A to the first data line 80A based on a gate signal received from the first gate line 82A. Similarly, the second display pixel 70B includes a second pixel electrode 74B and a second transistor 78B that selectively connects the second pixel electrode 74B to the second data line 80B based on the gate signal received from the first gate line 82A. In other words, the first display pixel 70A and the second display pixel 70B may substantially simultaneously connect and disconnect the first pixel electrode 74A and the second pixel electrode 74B.

Additionally, the third display pixel 70C includes a third pixel electrode 74C and third transistor 78C that selectively connects the third pixel electrode 74C to the first data line 80A based on a gate signal received from the second gate line 82B. Similarly, the fourth display pixel 70D includes a fourth pixel electrode 74D and a fourth transistor 78D that selectively connects the fourth pixel electrode 74D to the second data line 80B based on the gate signal received from the second gate line 82B. In other words, the third display pixel 70C and the fourth display pixel 70D may substantially simultaneously connect and disconnect the third pixel electrode 74C and the fourth pixel electrode 74D.

Figure 14:
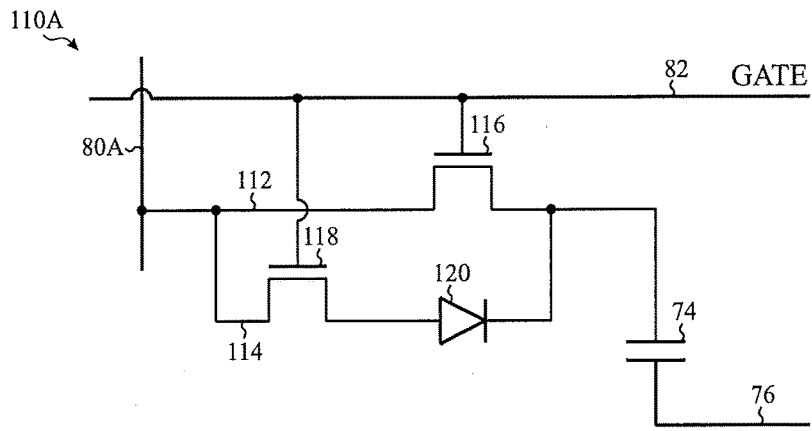
FIG. 14 is a schematic diagram of a modified display pixel, in accordance with an embodiment.

The present disclosure provides multiple embodiments that enable adjusting the discharge rate relative to the charge rate of pixel electrodes 74 by modifying configuration of display pixels 70. A schematic diagram of an embodiment of a modified display pixel 110A is described in FIG. 14. As depicted, the modified display pixel 110A includes a first conductive path 112 coupled in parallel with a second conductive path 114 between a data line 80 and a pixel electrode 74. More specifically, the first conductive path 112 includes a first transistor 116 and the second conductive path 114 includes a second transistor 118 and a second diode electrically coupled in series.

To simplify discussion, the data lines 80 are described as having constant voltages. More specifically, the first data line 80A is described as being a constant 5V and the second data line 80B is described as being a constant −5V to display a current image frame. Since the polarity of the data lines 80 alternate between successive image frames, the first data line 80A was a constant −5V and the second data line 80B was a constant 5V to display a directly previous image frame.

As depicted, at t0, the first gate signal 100 is high and the second gate signal 102 is low. Thus, at t0, the first pixel electrode 74A is connected to the first data line 80A and the second pixel electrode 74B is connected to the second data line 80B, thereby causing the first pixel electrode 74A to store 5V and the second pixel electrode to store −5V. Additionally, since the second gate signal 102 is low, the third pixel electrode 74C and the fourth pixel electrode 74D still stores the voltage used to display the directly previous image frame. As such, at t0, the third pixel electrode 74C stores −5V and the fourth pixel electrode stores 5V.

At t1, the second gate signal 102 is increasing and connects the third pixel electrode 74C to the first data line 80A and the fourth pixel electrode 74D to the second data line 80B. As such, at t1, the first data line 80A begins to charge the third pixel electrode 74C from −5V to 5V and the second data line 80B begins to discharge the fourth pixel electrode 74D from 5V to −5V. Since the voltage is increasing, the third pixel electrode 74C causes a positive voltage disturbance 104. On the other hand, since the voltage is decreasing, the fourth pixel electrode 74D causes a negative voltage disturbance 106.

However, the charge rate of the third pixel electrode 74C varies from the discharge rate of the fourth pixel electrode 74D. To charge the third pixel electrode 74C, current flows from the first data line 80A, into a drain of the third transistor 78C, out a source of the third transistor 78C, and into the third pixel electrode 74C. Thus, as the third pixel electrode 74C charges, its voltage increases, thereby decreasing the gate to source voltage ($V_{GS}$) and, thus, channel width of the third transistor 78C used to charge the third pixel electrode.

On the other hand, to discharge the fourth pixel electrode 74D, current flow from the fourth pixel electrode 74D, into a drain of the fourth transistor 78D, out a source of the fourth transistor 78D, and into the second data line 80B. However, as the fourth pixel electrode 74D discharges, the voltage of the second data line 80B and, thus, the source voltage of the fourth transistor 78D remains relatively constant. Thus, the gate to source voltage ($V_{GS}$) may remain relatively constant during discharge, thereby enabling the fourth pixel electrode 74D to charged with a relatively constant channel width of the fourth transistor 78D.

As such, the discharge rate of the fourth pixel electrode 74D is faster than the charge rate of the third pixel electrode 74C. Since capacitive coupling 88 is based on change of voltage over time, the profile of the positive voltage disturbance 104 caused by the third pixel electrode 74C and the profile of the negative voltage disturbance 106 caused by the fourth pixel electrode 74D vary. More specifically, the negative voltage disturbance 106 has a larger magnitude and a shorter duration. On the other hand, the positive voltage disturbance 104 has a smaller magnitude and a longer duration.

The common electrode voltage 108 is a sum of the positive voltage disturbance 104 and the negative voltage disturbance 106. Although some of the positive voltage disturbance 104 and the negative voltage disturbance 106 may cancel, the majority does not. Accordingly, the common electrode voltage 108 creates a ripple by going negative for period and subsequently going positive for a period.

As described above, variation in the common electrode voltage 108 may be affect voltage stored in pixel electrodes 74, thereby creating perceivable visual artifacts. To help illustrate, at t2, the first gate signal 100 goes low to disconnect the first pixel electrode 74A from the first data line 80A and the second pixel electrode 74B from the second data line 80B. However, as depicted, the common electrode voltage 108 is biased negative between t1 and t2. Since the first pixel electrode 74A and the second pixel electrode 74B remain connected during this period their stored voltages can still fluctuate. For example, the negative common electrode voltage 108 causes the voltage stored in the first pixel electrode 74A to increases above 5V and the voltage stored in the second pixel electrode to decrease below −5V. The voltage variations are then stored when the first pixel electrode 74A and the second pixel electrode 74B are disconnected, thereby causing the first display pixel 70A and the second display pixel 70B to output incorrect luminance.

As described above, variations in the common electrode voltage 108 may be reduced by canceling out voltage disturbances. For example, variations to the common electrode voltage 108 may be reduced when the positive voltage disturbance 104 and the negative voltage disturbance 106 have approximately the same profile (e.g., magnitude and duration) with opposite polarity. To facilitate, the discharge rate of pixel electrodes 74 may be adjusted in relation to the charge rate of pixel electrodes 74. For example, the discharge rate may be reduced so that magnitude of the negative voltage disturbance 106 may be reduced and duration increased.

Figure 18:
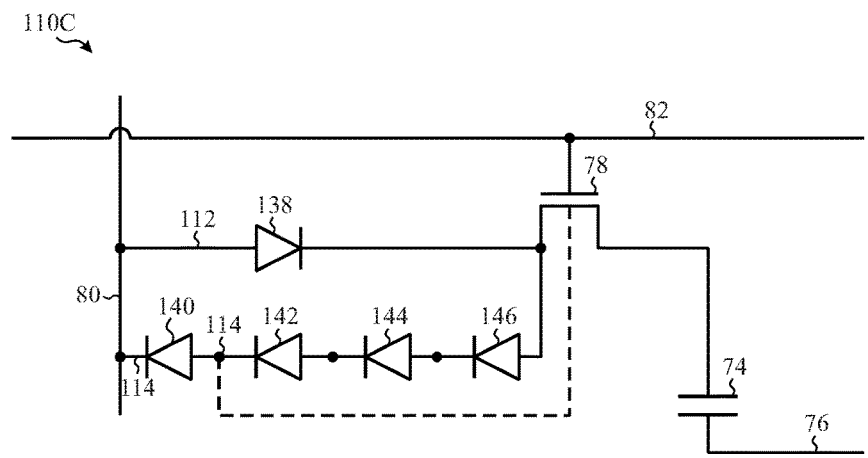
FIG. 18 is a schematic diagram of a modified display pixel, in accordance with an embodiment.

A schematic diagram of another embodiment of a modified display pixel 110B is shown in FIG. 18. As depicted, the modified display pixel 110B includes a first conductive path 112 coupled in parallel with a second conductive path 114 between a data line 80 and a pixel electrode 74. More specifically, the first conductive path 112 includes a first one or more diodes connected in series and the second conductive path 114 includes a second one or more diodes connected in series. For example, in the depicted embodiment, the first conductive path 112 includes a first diode 138 and the second conductive path 114 includes a second diode 140, a third diode 142, a fourth diode 144, and a fifth diode 146. Since diodes generally produce a voltage drop when conducting current, the first one or more diodes on the first conductive 112 may reduce voltage applied to the pixel electrode and diodes on the second conductive path 114 may reduce the gate to source voltage (Vgs) of a transistor 78. Thus, in other embodiments, any number of diodes may be included on the first conductive path 112 and the second conductive path 114 to adjust the charging voltage and/or the gate to source voltage of the transistor 78.

Figure 15:
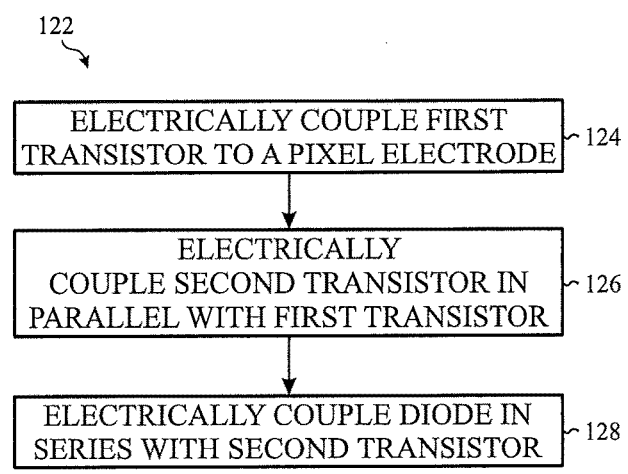
FIG. 15 is a flow diagram describing a process for manufacturing the modified display pixel of FIG. 14, in accordance with an embodiment.

One embodiment of a process 122 for manufacturing the modified display pixel 110A is described in FIG. 15. Generally, the process 122 includes electrically coupling the first transistor 116 to the pixel electrode 74 (process block 124), electrically coupling the second transistor 118 in parallel with the first transistor 116 (process block 126), and electrically coupling the diode in series with the second transistor 118 (process block 128).

Figure 19:
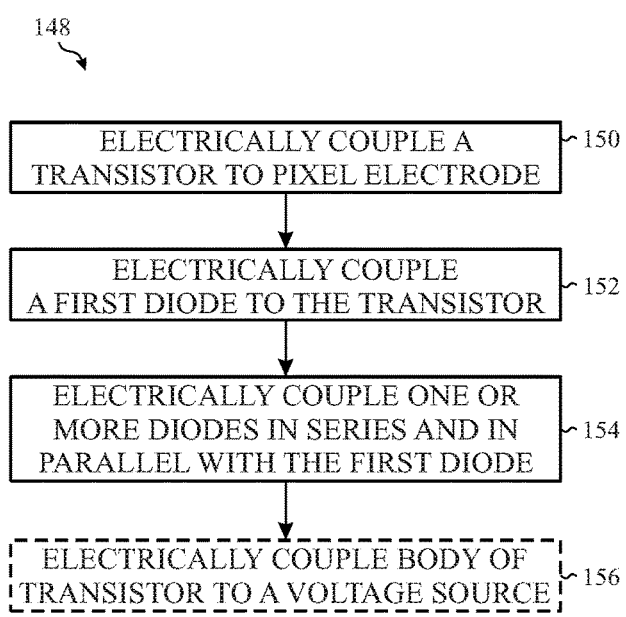
FIG. 19 is a flow diagram describing a process for manufacturing the modified display pixel of FIG. 18, in accordance with an embodiment.

One embodiment of a process 148 for manufacturing the modified display pixel 110B is described in FIG. 19. Generally, the process 148 includes electrically coupling the transistor 78 to the pixel electrode 74 (process block 150), electrically coupling a first one or more diodes to the transistor 78 (process block 152), electrically coupling one or more diodes in series and in parallel with the first diode 138 (process block 154), and optionally electrically coupling a body of the transistor 78 to a voltage source (process block 156).

In addition to being electrically coupled in series with the second transistor 118, the diode 120 may be electrically coupled to the pixel electrode 74. In some embodiments, the diode 120 may be implemented as third transistor with its gate electrically coupled to its drain. As such, the diode 120 may restrict current flow direction in the second conductive path 114. For example, in the embodiment depicted in FIG. 14, the diode 120 may enable current flow into the modified display pixel 110A but restrict current flow out of the modified display pixel 110A. In other words, the first conductive path 112 may be used to discharge the pixel electrode 74 while both the first conductive path 112 and the second conductive path 114 may be used to charge the pixel electrode 74.

In such embodiments, the first transistor 116 may control current bandwidth available to discharge the pixel electrode 74 while both the first transistor 116 and the second transistor 118 may control current bandwidth available to charge the pixel electrode 74. For example, the first transistor 116 and the second transistor 118 may be selected so that ratio of the channel width of the first transistor 116 to the combined channel width of the first transistor 116 and the second transistor 118 adjusts the charge rate and the discharge rate relative to one another.

Figure 16:
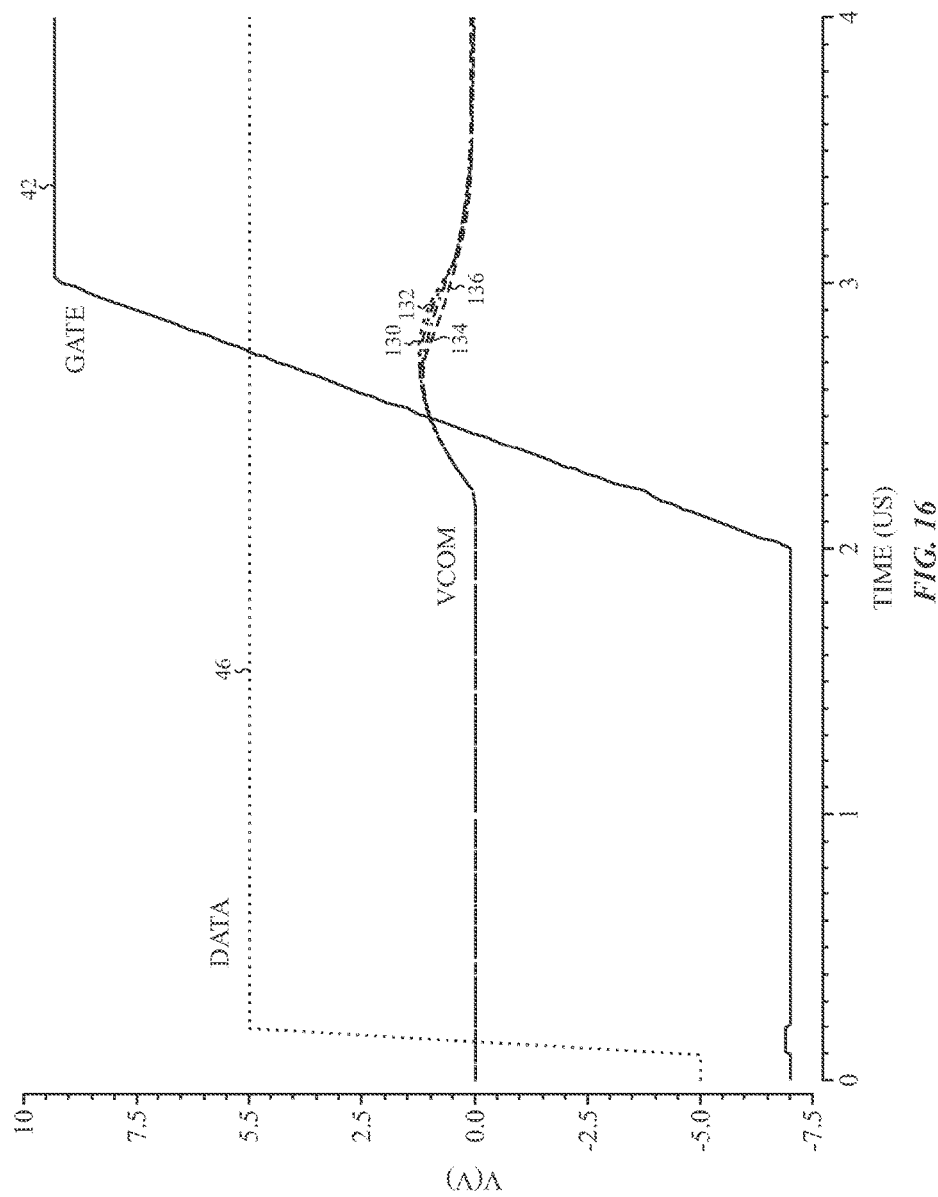
FIG. 16 is a plot of common electrode voltage in the modified display pixel of FIG. 14 when charging, in accordance with an embodiment.
Figure 17:
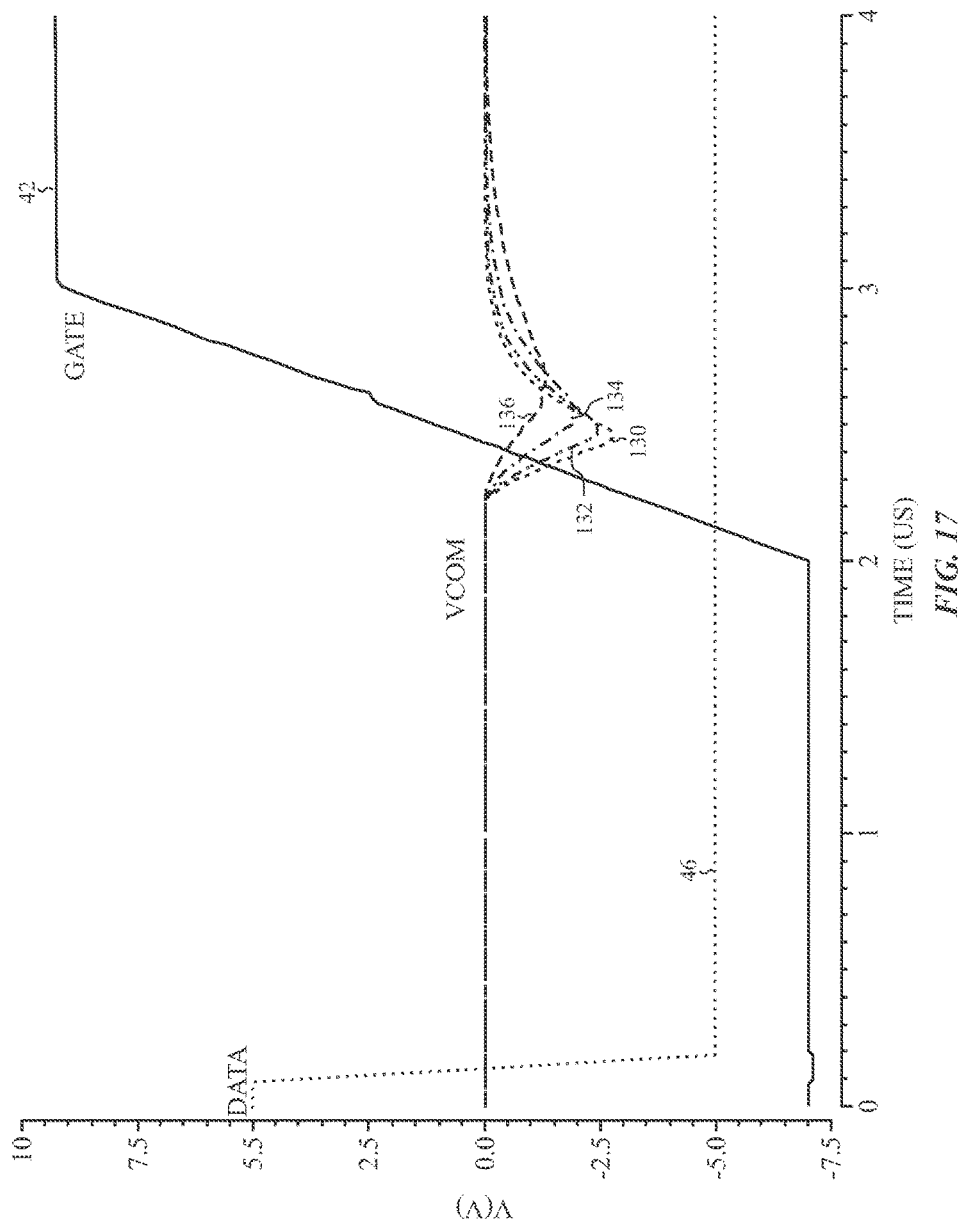
FIG. 17 is a plot of common electrode voltage in the modified display pixel of FIG. 14 when discharging, in accordance with an embodiment.

To help illustrate, FIG. 16 is a plot describing resulting common electrode voltage during charging and FIG. 17 is a plot describing the resulting common electrode voltage during discharging when different channel width ratios are used. In the described example, the different channel width ratios include a first ratio, in which the first transistor 116 channel width is four times greater than the second transistor 118, a second ratio, in which the first transistor 116 channel width is one and a half times greater than the second transistor 118, a third ratio, in which the second transistor 118 channel width is one and a half times greater than the first transistor 116, and a fourth ratio, in which the second transistor 118 channel width is four times greater than the first transistor 116. Additionally, a first common electrode voltage 130 results when the first ratio is used, a second common electrode voltage 132 results when the second ratio is used, a third common electrode voltage 134 results when the third ratio is used, and a fourth common electrode 136 voltage results when the fourth ratio is used.

As described in FIG. 16, the data signal 46 goes from −5V to 5V at approximately 0.1 microseconds and the gate signal 42 begins to increase at approximately 2 microseconds. At approximately 2.2 microseconds, the gate signal 42 is sufficient to connect the pixel electrode 74 to the data line 80, thereby charging the pixel electrode 74 and causing a positive voltage disturbance on the common electrode 76. In fact, as depicted, the first common electrode voltage 130, the second common electrode voltage 132, the third common electrode voltage 134, and the fourth common electrode voltage 136 each have approximately the same profile (e.g., magnitude of approximately 1.5V and duration of approximately 1.2 microseconds. Thus, the limiting factor on charge rate of the pixel electrode 74 may be increase of voltage at the source of the transistor 78 caused by charging.

As described in FIG. 17, the data signal 46 goes from 5V to −5V at approximately 0.1 microseconds and the gate signal 42 begins to increase at approximately 2 microseconds. At approximately 2.2 microseconds, the gate signal 42 is sufficient to connect the pixel electrode 74 to the data line 80, thereby discharging the pixel electrode 74 and causing a negative voltage disturbance on the common electrode 76. As depicted, the first common electrode voltage 130 has a voltage disturbance with a magnitude of approximately 3V and a duration of approximately 0.8 microseconds, the second common electrode voltage 132 has voltage disturbance with a magnitude of approximately 2.5V and a duration of approximately 0.9 microseconds, the third common electrode voltage 134 has voltage disturbance with a magnitude of approximately 2V and a duration of approximately 1 microsecond, and the fourth common electrode voltage 136 has voltage disturbance with a magnitude of approximately 1.5V and a duration of approximately 1.6 microseconds.

Figure 20:
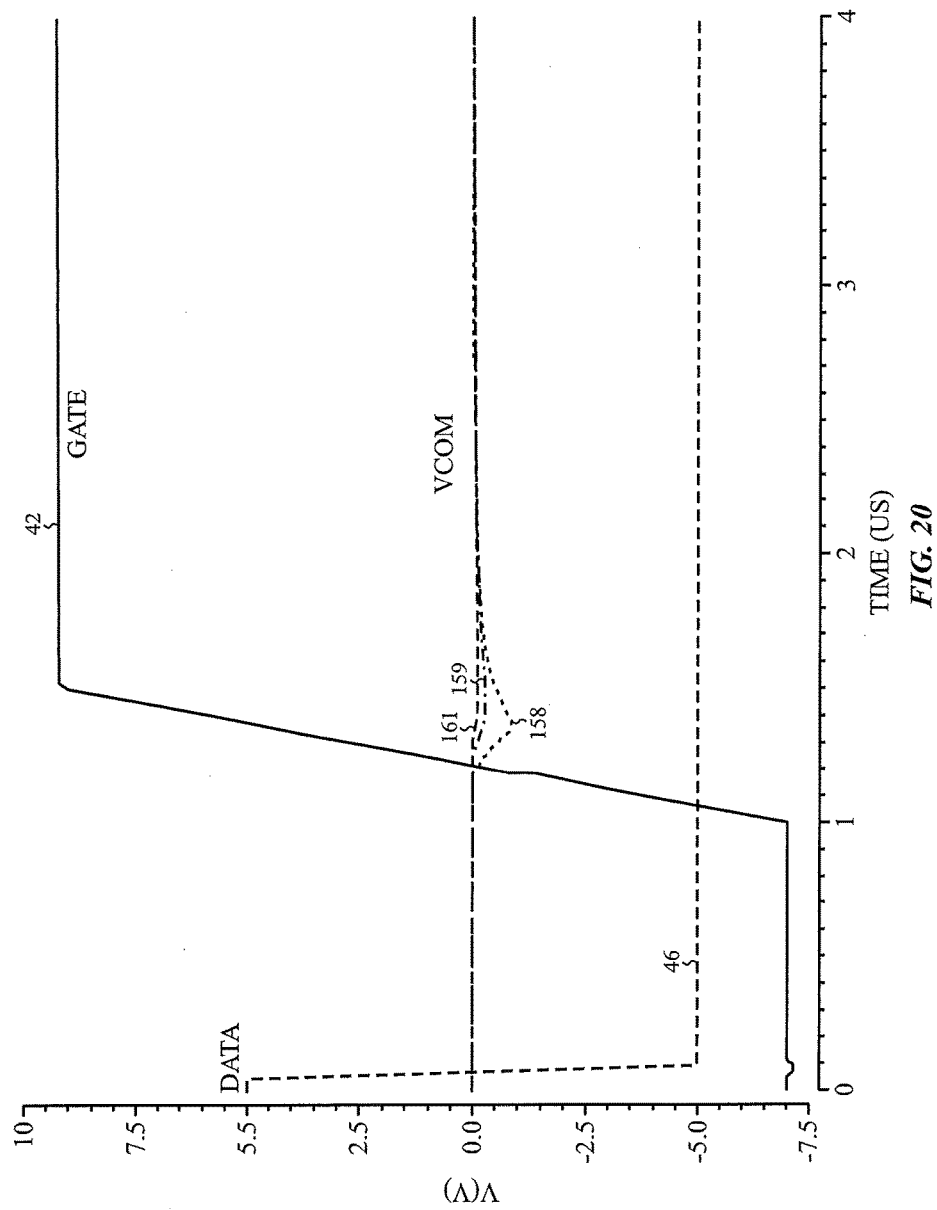
FIG. 20 is a plot of common electrode voltage in the modified display pixel of FIG. 18 when discharging, in accordance with an embodiment.

To help illustrate, FIG. 20 is a plot describing resulting common electrode voltage during discharging when different number of diodes are included on the second conductive path 114. In the described example, a first common electrode voltage 158 results when one diode is included, a second common electrode voltage 159 results when two diodes are included, and a third common electrode voltage 161 results when three diodes are included.

As described in FIG. 20, the data signal 46 goes from 5V to −5V at approximately 0.1 microseconds and the gate signal 42 begins to increase at approximately 2 microseconds. At approximately 2.3 microseconds, the gate signal 42 is sufficient to connect the pixel electrode 74 to the data line 80, thereby discharging the pixel electrode 74 and causing a negative voltage disturbance on the common electrode 76. As depicted, the first common electrode voltage 158 has a voltage disturbance with a magnitude of approximately 1V, the second common electrode voltage 159 has a voltage disturbance with a magnitude of approximately 0.5V, and the third common electrode voltage 161 has a voltage disturbance with a magnitude of approximately 0.25V each with slightly varying durations.

A schematic diagram of another embodiment of a modified display pixel 110B. As depicted, the modified display pixel 110B includes a first conductive path 112 coupled in parallel with a second conductive path 114 between a data line 80 and a pixel electrode 74. More specifically, the first conductive path 112 includes a first one or more diodes connected in series and the second conductive path 114 includes a second one or more diodes connected in series. For example, in the depicted embodiment, the first conductive path 112 includes a first diode 138 and the second conductive path 114 includes a second diode 140, a third diode 142, a fourth diode 144, and a fifth diode 146. Since diodes generally produce a voltage drop when conducting current, the first one or more diodes on the first conductive 112 may reduce voltage applied to the pixel electrode and diodes on the second conductive path 114 may reduce the gate to source voltage ($V_{GS}$) of a transistor 78. Thus, in other embodiments, any number of diodes may be included on the first conductive path 112 and the second conductive path 114 to adjust the charging voltage and/or the gate to source voltage of the transistor 78.

Additionally, voltage on the body of the transistor 78 may optionally be artificially increased to increase the threshold voltage of the transistor 78. In some embodiments, the body of the transistor 78 may be electrically coupled to an internal voltage source, such as a node between two diodes on the second conductive path 114. For example, in the depicted embodiment, the body of the transistor 78 is connected to a node 147 between the second diode 140 and the third diode 142. In other embodiments, the body of the transistor 78 may be electrically coupled to an external voltage source.

Figure 21:
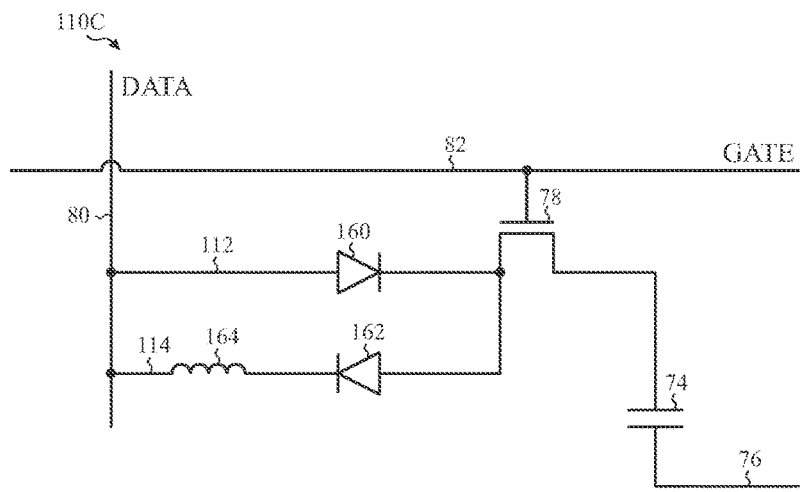
FIG. 21 is a schematic diagram of a modified display pixel, in accordance with an embodiment.

A schematic diagram of another embodiment of a modified display pixel 110C is described in FIG. 21. As depicted, the modified display pixel 110C includes a first conductive path 112 coupled in parallel with a second conductive path 114 between a data line 80 and a transistor 78. More specifically, the first conductive path 112 includes a first diode 160 and the second conductive path 114 includes a second diode 162 and a first inductor 164 coupled in series. In some embodiments, the modified display pixel 110C may include a second inductor 166 electrically coupled between a gate of the transistor 78 and a gate line 82, as described in FIG. 22. The second inductor 166 may be inductively coupled to the first inductor 164 such that a voltage is induced in the first inductor 164 when a gate signal turns on the transistor 78.

Figure 23:
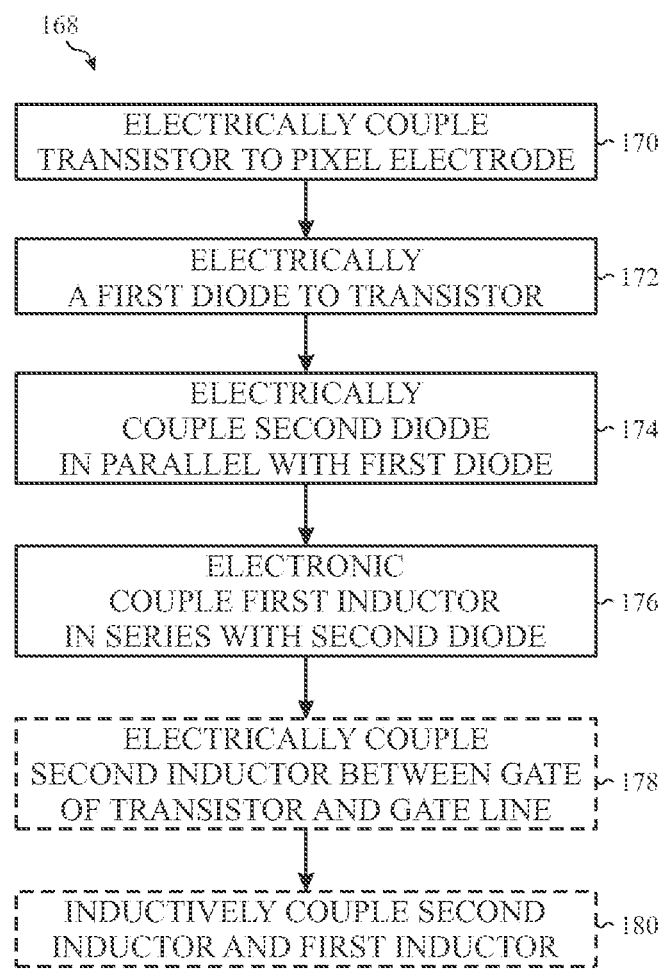
FIG. 23 is a flow diagram describing a process for manufacturing the modified display pixels of FIGS. 21 and 22, in accordance with an embodiment.

One embodiment of a process 168 for manufacturing the modified display pixel 110C is described in FIG. 23. Generally, the process 168 includes electrically coupling the transistor 78 to the pixel electrode 74 (process block 170), electrically coupling the first diode 160 to the transistor 78 (process block 172), electrically coupling the second diode 162 in parallel with the first diode 160 (process block 174), electrically coupling the first inductor 164 in series with the second diode 162 (process block 176), and optionally electrically coupling the second inductor 166 to a gate of the transistor 78 (process block 178) and inductively coupling the second inductor 166 and the first inductor 164 (process block 180).

Additionally, the first one or more diodes may be electrically coupled to the transistor 78 to restrict current flow in the first conductive path 112. For example, in the embodiment depicted in FIG. 18, the first diode 138 may enable current flow into the modified display pixel 110B but restrict current flow out of the modified display pixel 110B. As such, the first conductive path 112 may be used to charge the pixel electrode 74.

Similarly, the second one or more diodes may be coupled to the transistor 78 to restrict current flow in the second conductive path 114. For example, in the embodiment depicted in FIG. 18, the second diode 140, the third diode 142, the fourth diode 144, and the fifth diode 146 may enable current flow out of the modified display pixel 110B but strict current flow into the modified display pixel 110B. As such, the second conductive path 114 may be used to discharge the pixel electrode 74.

In such embodiments, the transistor 78 may control both current bandwidth available to discharge the pixel electrode 74 and current bandwidth available to charge the pixel electrode 74. For example, the transistor 78 may be operated so that a larger portion of its channel width is utilized to charge the pixel electrode 74 than used to discharge the pixel electrode 74.

In some embodiments, the portion of the channel width available to conduct current may be controlled based at least in part on difference between the gate to source voltage ($V_{GS}$) and the threshold voltage of the transistor 78. Since diodes generally cause a voltage drop when conducting current, the diodes on the second conductive path 114 may be utilized to reduce the source voltage and, thus, the gate to source voltage of the transistor 78 during discharging. For example, when discharging to −5V, each of diode 140-146 on the second conductive path 114 may cause a 0.8V decrease. In such an embodiment, the source of the transistor 78 may be increased to −2.2V. In other words, the number of diodes included on the second conductive path 114 may selected to adjust the discharge rate relative to the charge rate of the pixel electrode 74.

To help illustrate, FIG. 20 is a plot describing resulting common electrode voltage during discharging when different number of diodes are included on the second conductive path 114. In the described example, a first common electrode voltage 158 results when one diode is included, a second common electrode voltage 160 results when two diodes are included, and a third common electrode 162 results when three diodes are included.

As described in FIG. 20, the data signal 46 goes from 5V to −5V at approximately 0.1 microseconds and the gate signal 42 begins to increase at approximately 2 microseconds. At approximately 2.3 microseconds, the gate signal 42 is sufficient to connect the pixel electrode 74 to the data line 80, thereby discharging the pixel electrode 74 and causing a negative voltage disturbance on the common electrode 76. As depicted, the first common electrode voltage 158 has a voltage disturbance with a magnitude of approximately 1V, the second common electrode voltage 160 has a voltage disturbance with a magnitude of approximately 0.5V, and the third common electrode voltage 162 has a voltage disturbance with a magnitude of approximately 0.25V each with slightly varying durations.

Thus, as the number of diodes on the second conductive leg 114 is increased, the magnitude of negative voltage disturbance decreases, which indicates that the voltage of the pixel electrode 74 is discharging at a slower rate. In other words, the amount of the transistor 78 channel width available for discharging may be a limiting factor on the discharge rate.

As such, the number of diodes on the second conductive path 114 and/or the first conductive path 112 may be selected to adjust the discharge rate relative to the charge rate of the pixel electrode 74 to increase canceling between positive voltage disturbances and negative voltage disturbances. For example, when an equal number of pixel electrodes 74 are charging and discharging, the number of diodes may be selected so that the charge rates and the discharge rates of each pixel electrode 74 is approximately equal. In this manner, each pair of charging and discharging pixel electrode 74 may cause voltage disturbances with approximately the same profile and opposite polarity, thereby canceling. For example, assuming the positive voltage disturbance caused by charging described above, two diodes may be included on the second conductive path to reduce variations in common electrode voltage.

A schematic diagram of another embodiment of a modified display pixel 110C is described in FIG. 21. As depicted, the modified display pixel 110C includes a first conductive path 112 coupled in parallel with a second conductive path 114 between a data line 80 and a transistor 78. More specifically, the first conductive path 112 includes a first diode 160 and the second conductive path 114 includes a second diode 162 and a first inductor 164 coupled in series. In some embodiments, the modified display pixel 110B may include a second inductor 166 electrically coupled between a gate of the transistor 78 and a gate line 82, as described in FIG. 22. The second inductor 166 may be inductively coupled to the first inductor 164 such that a voltage is inducted in the first inductor 164 when a gate signal turns on the transistor 78.

Figure 22:
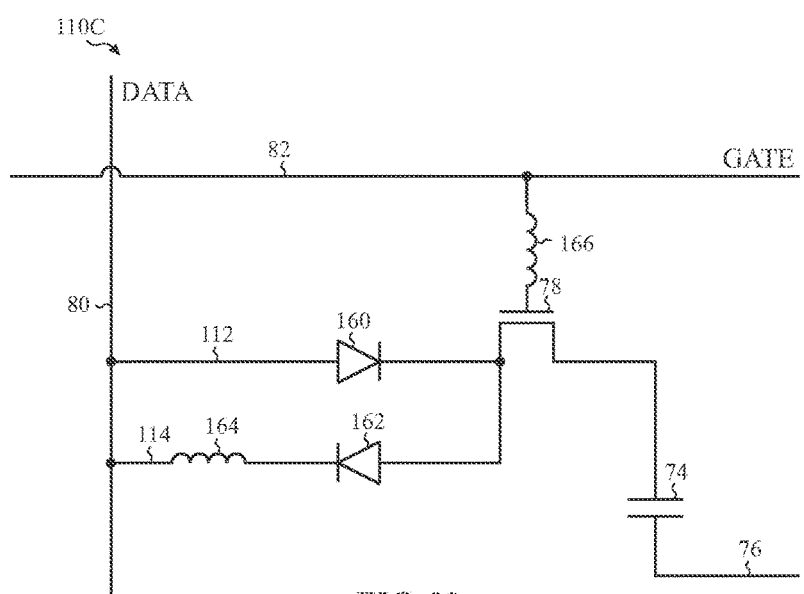
FIG. 22 is a schematic diagram of a modification to the modified display pixel of FIG. 21, in accordance with an embodiment.

One embodiment of a process 168 for manufacturing the modified display pixel 110C is described in FIG. 22. Generally, the process 168 includes electrically coupling the transistor 78 to the pixel electrode 74 (process block 170), electrically coupling the first diode 160 to the transistor 78 (process block 172), electrically coupling the second diode 162 in parallel with the first diode 160 (process block 174), electrically coupling the first inductor 164 in series with the second diode 162 (process block 176), and optionally electrically coupling the second inductor 166 to a gate of the transistor 78 (process block 178) and inductively coupling the second inductor 166 and the first inductor 164 (process block 180).

In some embodiments, the transistor 78 may enable electrical coupling to a gate line 82. As such, the transistor 78 may receive gate signals from the gate line 82 to turn on and turn off, thereby connecting the pixel electrode 74 to a data line 80 or disconnecting the pixel electrode 74 from the data line 80.

Additionally, the first diode 160 may be electrically coupled to the transistor 78 to restrict current flow in the first conductive path 112. For example, in the embodiment depicted in FIG. 21, the first diode 138 may enable current flow into the modified display pixel 110C but restrict current flow out of the modified display pixel 110C. As such, the first conductive path 112 may be used to charge the pixel electrode 74.

Similarly, the second diode 162 may be coupled to the transistor 78 to restrict current flow in the second conductive path 114. For example, in the embodiment depicted in FIG. 21, the second diode 162 may enable current flow out of the modified display pixel 110C but strict current flow into the modified display pixel 110C. As such, the second conductive path 114 may be used to discharge the pixel electrode 74.

In such embodiments, the first inductor 164 may control current bandwidth available to discharge the pixel electrode 74. Since an inductor may resist changes in current, the first inductor 164 may limit rate at which current flows through the second conductive leg 114 to discharge the pixel electrode 74. In some embodiments, the first inductor 164 may be formed in plane by forming a spiral in the second conductive path 114. As such, the first inductor 164 may be selected to adjust the discharge rate relative to the charge rate of the pixel electrode 74.

Figure 24:
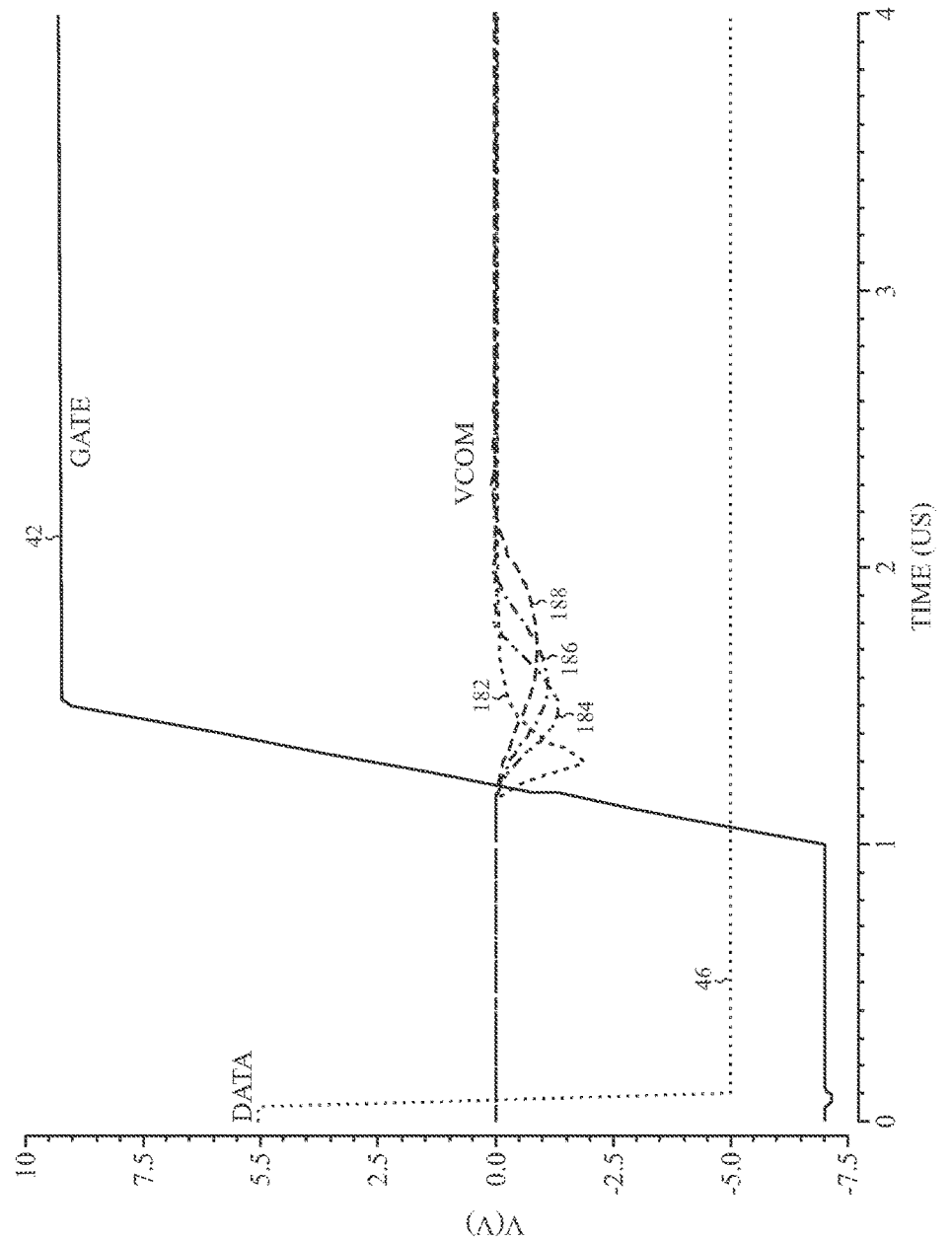
FIG. 24 is a plot of common electrode voltage in the modified display pixel of FIG. 21 when discharging, in accordance with an embodiment.

To help illustrate, FIG. 24 is a plot describing resulting common electrode voltage during discharging when the first inductor 164 has different inductances. In the described example, a first common electrode voltage 182 results when the first inductor 164 has a first inductance, a second common electrode voltage 184 results when the first inductor 164 has a second inductance twice the first inductance, a third common electrode voltage 186 results when the first inductor 164 has a third inductance three times the first inductance, and a fourth common electrode voltage 188 when the first inductor has a fourth inductance four time the first inductance.

As described in FIG. 24, the data signal 46 goes from 5V to −5V at approximately 0.1 microseconds and the gate signal 42 begins to increase at approximately 2 microseconds. At approximately 2.3 microseconds, the gate signal 42 is sufficient to connect the pixel electrode 74 to the data line 80, thereby discharging the pixel electrode 74 and causing a negative voltage disturbance on the common electrode 76. As depicted, the first common electrode voltage 182 has a voltage disturbance with a magnitude of approximately 2V and a duration of approximately 1 microsecond, the second common electrode voltage 184 has a voltage disturbance with a magnitude of approximately 1.5V and a duration of approximately 1.4 microseconds, and the third common electrode voltage 186 has a voltage disturbance with a magnitude of approximately 1V and a duration of approximately 1.6 microseconds, and the fourth common electrode voltage 188 has a voltage disturbance with a magnitude of approximately 0.75V and a duration of approximately 2 microseconds.

Thus, as the inductance of the first inductor 164 increase, the magnitude of negative voltage disturbances decreases and duration increases, which indicates that the pixel electrode 74 is discharging at a slower rate. In other words, the inductance of the first inductor 164 may be a limiting factor of the discharge rate.

As such, the first inductor 164 may be selected to adjust the discharge rate relative to the charge rate of the pixel electrode 74 to increase canceling between positive voltage disturbances and negative voltage disturbances. For example, when an equal number of pixel electrodes 74 are charging and discharging, the first inductor 164 may be selected so that the charge rates and the discharge rates of each pixel electrode 74 is approximately equal. In this manner, each pair of charging and discharging pixel electrode 74 may cause voltage disturbances with approximately the same profile and opposite polarity, thereby canceling. For example, assuming the positive voltage disturbance caused by charging described above, the first inductor 164 with an inductance four times the first inductance may be selected to reduce variations in common electrode voltage.

Furthermore, inductively coupling the first inductor 164 and the second inductor 166 may enable further adjusting the discharge rate relative to the charge rate of the pixel electrode 74. When a gate signal goes high, current flows from the gate line 82 through the second inductor 164 and into the transistor 78. Since inductively coupled, the change of current in the second inductor 166 may induce a voltage in the first inductor 164. More specifically, the voltage induced in the first inductor 164 may increase the source voltage and, thus, decrease the gate to source voltage ($V_{GS}$) of the transistor 78. As described above, decreasing the gate to source voltage may reduce the channel bandwidth of the transistor 78 available to discharge the pixel electrode 74, thereby adjusting the discharge rate of the pixel electrode 74 relative to the charge rate.

The magnitude of the voltage induced in the first inductor 164 may be based at least in part on a coupling factor between the first inductor 164 and the second inductor 166. As such, the coupling factor may be selected to adjust the discharge rate relative to the charge rate of pixel electrodes 74.

To help illustrate, FIG. 25 is a plot describing resulting common electrode voltage during discharging using different coupling factors. In the described example, a first common electrode voltage 190 results when a coupling factor of zero is used, a second common electrode voltage 192 results when a coupling factor of 0.2 is used, a third common electrode voltage 194 results when a coupling factor of 0.4 is used, a fourth common electrode voltage 196 results when a coupling factor of 0.6 is used, a fifth common electrode voltage 198 results when a coupling factor of 0.8 is used, and a sixth common electrode voltage 200 results when a coupling factor of 1.0 is used.

As described in FIG. 25, the pixel electrode 74 begins discharging at approximately 2.6 microseconds, thereby causing a negative voltage disturbance on the common electrode. As depicted, the first common electrode voltage 190 has a voltage disturbance with a magnitude of approximately 1.1V and a duration of approximately 1.2 microsecond, the second common electrode voltage 192 has a voltage disturbance with a magnitude of approximately 1.3V and a duration of approximately 1.2 microseconds, and the third common electrode voltage 194 has a voltage disturbance with a magnitude of approximately 0.95V and a duration of approximately 1.4 microseconds, the fourth common electrode voltage 196 has a voltage disturbance with a magnitude of approximately 0.85V and a duration of approximately 2.4 microseconds, the fifth common electrode voltage 198 has a voltage disturbance with a magnitude of approximately 0.75V and a duration of approximately 2.5 microseconds, and the sixth common electrode voltage 200 has a voltage disturbance with a magnitude of approximately 0.65V and a duration of approximately 2.6 microseconds.

Thus, as the coupling factor between the first inductor 164 and the second inductor 166 increases, the magnitude of negative voltage disturbances decreases and duration increases, which indicates that the pixel electrode 74 is discharging at a slower rate. In other words, the coupling factor may be a limiting factor on the discharge rate.

As such, the coupling factor may be selected to adjust the discharge rate relative to the charge rate of the pixel electrode 74 to increase canceling between positive voltage disturbances and negative voltage disturbances. For example, when an equal number of pixel electrodes 74 are charging and discharging, the first inductor 164 may be selected so that the charge rates and the discharge rates of each pixel electrode 74 is approximately equal so that voltage disturbances cancel. For example, assuming the positive voltage disturbance caused by charging described above, a coupling factor of 0.4 or 0.6 may be selected to reduce variations in common electrode voltage.

In some embodiments, techniques for different embodiments may be combined to further adjust discharge rate and/or charge rate relative to one another. For example, combining techniques from the second modified pixel electrode 110B and the third pixel electrode 110C, multiple diodes may be coupled in series with the first inductor 164 on the second conductive path 114. Additionally, combining techniques from the first modified display pixel 110A and the second modified display pixel 110B, multiple diodes may be coupled in series between the first transistor 116. Other combinations may be adapted to adjust the charge rate and discharge rate based on specific implementation.

Thus, the present disclosure provides technical advantages that include improving displayed image quality by reducing likelihood of perceptible visual artifacts. More specifically, some embodiment may reduce likelihood of perceivable visual artifacts by reducing voltage variations that may be caused in electrically isolated common electrodes. In some embodiments, the voltage variations may be reduced by adjusting discharge rate and charge rate relative to one another so that voltage disturbances caused by charging and discharging may cancel.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display comprising:
   a first display pixel, wherein the first display pixel comprises:
      a first pixel electrode configured to produce a first electric field with a first common electrode to control luminance of the first display pixel;
      a first transistor electrically coupled to the first pixel electrode, wherein:
         the first transistor comprises a first gate coupled to a gate line; and
         the first transistor is configured to control charging and discharging of the first pixel electrode through the first transistor based at least in part on a gate signal received from the gate line; and
      a second transistor electrically coupled in series with a diode, wherein:
         the second transistor and the diode are electrically coupled in parallel with the first transistor;
         the second transistor comprises a second gate coupled to the gate line; and
         the second transistor is configured to control charging of the first pixel electrode through the diode based at least in part on the gate signal received from the gate line; and
   a touch pixel comprising the first common electrode, wherein the first common electrode is configured to indicate occurrence and position of a touch on a screen of the electronic display based at least in part on a change in mutual capacitance with a second common electrode.

2. The electronic display of claim 1, comprising a second display pixel, wherein the second display pixel comprises a second pixel electrode configured to produce a second electric field with the first common electrode to control luminance of the second display pixel;
   wherein the first display pixel is configured to cause a first voltage disturbance on the first common electrode and the second display pixel is configured to cause a second voltage disturbance on the first common electrode expected to substantially cancel out the first voltage disturbance.

3. The electronic display of claim 2, wherein:
   a first discharging rate of the first pixel electrode is approximately equal to a first charging rate of the second pixel electrode; and
   a second charging rate of the first pixel electrode is approximately equal to a second discharging rate of the second pixel electrode.

4. The electronic display of claim 1, wherein the first pixel electrode is configured to:
   cause a positive voltage disturbance on the first common electrode when charging; and
   cause a negative voltage disturbance on the first common electrode when discharging.

5. The electronic display of claim 1, wherein the first transistor is configured to limit discharge rate of the first pixel electrode.

6. The electronic display of claim 1, wherein channel width of the second transistor is greater than channel width of the first transistor.

7. The electronic display of claim 1, wherein the first transistor and the second transistor are configured to substantially simultaneously turn on and turn off based on the gate signal received from the gate line.

8. An electronic device comprising:
   a first plurality of display pixels configured to share a first common electrode, wherein each of the first plurality of display pixels comprises:
      a pixel electrode configured to store voltage received from a data line;
      a first conductive path electrically coupled between the pixel electrode and the data line, wherein the first conductive path is configured to only enable the data line to charge the pixel electrode; and
      a second conductive path electrically coupled between the pixel electrode and the data line in parallel with the first conductive path, wherein the second conductive path is configured to enable the data line to discharge the pixel electrode with a discharge rate approximately equal to a charge rate of the pixel electrode; and
   a touch pixel comprising the first common electrode, wherein the touch pixel is configured to detect occurrence and position of a touch on a screen of an electronic display using the first common electrode.

9. The electronic device of claim 8, comprising a second plurality of display pixels configured to share a second common electrode, wherein the second common electrode is electrically isolated from the first common electrode;
   wherein the touch pixel comprises the second common electrode and is configured to detect occurrence and position of the touch using the second common electrode.

10. The electronic device of claim 9, wherein:
    the first common electrode is configured to transmit a touch drive signal to produce a mutual capacitance with the second common electrode; and
    the second common electrode is configured to indicate changes in the mutual capacitance to facilitate detecting the touch.

11. The electronic device of claim 8, wherein:
    the first conductive path comprises a first transistor coupled in series with a diode, wherein the diode is configured to enable current to flow from the data line to the pixel electrode; and
    the second conductive path comprises a second transistor coupled in parallel with the first transistor and the diode, wherein the second transistor is configured to enable current to flow from the data line to the pixel electrode and from the pixel electrode to the data line.

12. The electronic device of claim 8, comprising a transistor electrically coupled to the first conductive path, the second conductive path, and the pixel electrode, wherein:
    the transistor is configured to selectively connect and disconnect the pixel electrode and the data line;
    the first conductive path comprises a first diode configured to enable current to flow from the data line to the pixel electrode; and
    the second conductive path comprises a second diode coupled in series with a third diode, wherein the second diode and the third diode are configured to:
       enable current to flow from the pixel electrode to the data line; and
       increase source voltage of the transistor such that the transistor utilizes less than its full channel width.

13. The electronic device of claim 12, wherein a body of the transistor is electrically coupled to a node between the second diode and the third diode or an external voltage source to increase threshold voltage of the transistor.

14. The electronic device of claim 8, comprising a transistor electrically coupled to the first conductive path, the second conductive path, and the pixel electrode, wherein:
the transistor is configured to selectively connect and disconnect the pixel electrode and the data line;
the first conductive path comprises a first diode configured to enable current to flow from the data line to the pixel electrode; and
the second conductive path comprises a second diode and a first inductor coupled in series;
wherein the second diode is configured to enable current to flow from the pixel electrode to the data line and the first inductor is configured to limit rate at which current flows from the pixel electrode to the data line.

15. The electronic device of claim 14, comprising a second inductor electrically coupled between a gate of the transistor and a gate line and inductively coupled to the first inductor, wherein the second inductor is configured to produce a voltage in the first inductor that increases source voltage of the transistor such that the transistor utilizes less than its full channel width.

16. The electronic device of claim 14, wherein the electronic device comprises a portable phone, a media player, a personal data organizer, a handheld game platform, a tablet device, a computer, or any combination thereof.

17. A method for manufacturing an electronic display, comprising:
forming a first common electrode that facilitates detection of occurrence and position of a touch on a screen of the electronic display; and
forming a first display pixel by:
forming a first pixel electrode to enable the first pixel electrode to produce a first electric field with the first common electrode that controls luminance of the first display pixel;
electrically coupling a first transistor to the first pixel electrode to enable the first transistor to control charging and discharging of the first pixel electrode;
electrically coupling a first diode to the first transistor to enable controlling charging of the first pixel electrode through the first diode; and
electrically coupling a second diode and a third diode in series and in parallel with the first diode to enable controlling discharging the first pixel electrode through the second diode and the third diode.

18. The method of claim 17, comprising electrically coupling a body of the first transistor to a node between the second diode and the third diode.

19. The method of claim 17, comprising selecting the second diode and the third diode to facilitate adjusting discharge rate of the first pixel electrode to approximately match charge rate of the first pixel electrode.

20. The method of claim 17, comprising selecting the second diode and the third diode such that the first transistor utilizes less than its full channel width when the first pixel electrode is discharging.

21. The method of claim 17, comprising:
forming a second common electrode that works with the first common electrode to facilitate detection of occurrence and position of the touch; and
forming a second display pixel by:
forming a second pixel electrode to enable the second pixel electrode to produce a second electric field with the second common electrode that controls luminance of the second display pixel;
electrically coupling a second transistor to the second pixel electrode to enable the second transistor to control charging and discharging of the second pixel electrode;
electrically coupling a fourth diode to the second transistor to enable controlling charging of the second pixel electrode through the fourth diode; and
electrically coupling a fifth diode and a sixth diode in series and in parallel with the fourth diode to facilitate controlling discharging of the second pixel electrode through the fifth diode and the sixth diode.

22. A method for manufacturing an electronic display, comprising:
forming a first common electrode that facilitates detecting occurrence and position of a touch on a screen of the electronic display; and
forming a first display pixel by:
forming a first pixel electrode to enable the first pixel electrode to produce a first electric field with the first common electrode that controls luminance of the first display pixel;
electrically coupling a first transistor to the first pixel electrode to enable the first transistor to control charging and discharging of the first pixel electrode;
electrically coupling a first diode to the first transistor to enable controlling charging of the first pixel electrode through the first diode; and
electrically coupling a second diode and a first inductor in series and in parallel with the first diode to facilitate controlling discharging of the first pixel electrode through the second diode and the first inductor.

23. The method of claim 22, comprising:
electrically coupling a second inductor to a gate of the first transistor; and
inductively coupling the second inductor to the first inductor to facilitate producing a voltage across the first inductor that increases source voltage of the first transistor when the first pixel electrode discharges.

24. The method of claim 22, comprising selecting the first inductor and the second diode to facilitate adjusting discharge rate of the first pixel electrode to approximately match charge rate of the first pixel electrode.

25. The method of claim 22, comprising selecting the first inductor and the second diode such that the first transistor utilizes less than its full channel width when the first pixel electrode is discharging.

26. The method of claim 22, comprising:
forming a second common electrode that works with the first common electrode to facilitate detection of occurrence and position of the touch; and
forming a second display pixel by:
forming a second pixel electrode to enable the second pixel electrode to produce a second electric field with the second common electrode that controls luminance of the second display pixel;
electrically coupling a second transistor to the second pixel electrode to enable the second transistor to control charging and discharging of the second pixel electrode;
electrically coupling a third diode to the second transistor to enable controlling charging of the second pixel electrode through the third diode; and
electrically coupling a fourth diode and a second inductor in series and in parallel with the third diode to facilitate controlling discharging of the second pixel electrode through the fourth diode and the second inductor.

27. The method of claim 22, wherein:

forming the first display pixel comprises electrically coupling a second transistor to the first pixel electrode in parallel with the first transistor and the first diode to enable controlling charging and discharging of the first pixel electrode through the second transistor; and forming the first common electrode comprises forming a touch pixel comprising the first common electrode that indicates occurrence and position of a touch on a screen of the electronic display based at least in part on a change in mutual capacitance between the first common electrode and a second common electrode.

28. The method of claim 17, wherein:

forming the first display pixel comprises electrically coupling a second transistor to the first pixel electrode in parallel with the first transistor and the first diode to enable controlling charging and discharging of the first pixel electrode through the second transistor; and forming the first common electrode comprises forming a touch pixel comprising the first common electrode that indicates occurrence and position of a touch on a screen of the electronic display based at least in part on a change in mutual capacitance between the first common electrode and a second common electrode.

* * * * *